(12) United States Patent
Siomina et al.

(10) Patent No.: US 11,064,559 B2
(45) Date of Patent: *Jul. 13, 2021

(54) METHOD OF SHARING A UE RECEIVER BETWEEN D2D AND CELLULAR OPERATIONS BASED ON ACTIVITY

(71) Applicant: Telefonaktiebolaget L M Ericsson (publ), Stockholm (SE)

(72) Inventors: Iana Siomina, Täby (SE); Muhammad Kazmi, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,153

(22) Filed: Dec. 11, 2019

(65) Prior Publication Data

US 2020/0120746 A1 Apr. 16, 2020

Related U.S. Application Data

(63) Continuation of application No. 16/162,481, filed on Oct. 17, 2018, now Pat. No. 10,536,987, which is a
(Continued)

(51) Int. Cl.
*H04W 76/28* (2018.01)
*H04W 76/14* (2018.01)
*H04W 72/02* (2009.01)

(52) U.S. Cl.
CPC ........... *H04W 76/28* (2018.02); *H04W 72/02* (2013.01); *H04W 76/14* (2018.02)

(58) Field of Classification Search
CPC ... H04M 1/7253; H04W 84/18; H04W 84/20; H04W 84/22; H04W 88/16
(Continued)

(56) References Cited

U.S. PATENT DOCUMENTS 9,661,684 B2 5/2017 Siomina et al.
10,129,924 B2 11/2018 Siomina et al.
(Continued)

FOREIGN PATENT DOCUMENTS

WO 2010025774 A1 3/2010
WO 2010082114 A1 7/2010
(Continued)

OTHER PUBLICATIONS

Asustek, "R2-144447: Detection of D2D grant," Third Generation Partnership Project (3GPP) TSG-RAN2 Meeting #87bis, Oct. 6-10, 2014, Shanghai, China, 3 pages.
(Continued)

*Primary Examiner* — Lee Nguyen
(74) *Attorney, Agent, or Firm* — Withrow & Terranova, PLLC

(57) ABSTRACT

Systems and methods are disclosed for utilizing non-overlapping time periods within one or more Discontinuous Reception (DRX) cycles configured for a Device-to-Device (D2D) capable wireless device for different types of operations. In some embodiments, these different types of operations are cellular and D2D operations such that the D2D capable wireless device performs cellular and D2D operations (e.g., reception of cellular and D2D signals) during non-overlapping time periods during one or more DRX cycles. In this manner, a D2D capable wireless device that, for example, can only receive one type of signal at a time is enabled to receive both cellular and D2D signals.

19 Claims, 14 Drawing Sheets

Related U.S. Application Data continuation of application No. 15/593,823, filed on May 12, 2017, now Pat. No. 10,129,924, which is a continuation of application No. 14/796,516, filed on Jul. 10, 2015, now Pat. No. 9,661,684.

(60) Provisional application No. 62/035,664, filed on Aug. 11, 2014.

(58) Field of Classification Search
USPC .................................. 455/41.1–41.2, 552.1
See application file for complete search history.

(56) References Cited

U.S. PATENT DOCUMENTS

| | | |
|---|---|---|
| 10,536,987 B2 | 1/2020 | Siomina et al. |
| 2011/0237231 A1 | 9/2011 | Horneman et al. |
| 2011/0268004 A1 | 11/2011 | Doppler et al. |
| 2013/0170398 A1 | 7/2013 | Kwon |
| 2014/0086152 A1 | 3/2014 | Bontu et al. |
| 2016/0044740 A1 | 2/2016 | Siomina et al. |
| 2017/0251520 A1 | 8/2017 | Siomina et al. |
| 2019/0053323 A1 | 2/2019 | Siomina et al. |

FOREIGN PATENT DOCUMENTS

| | | |
|---|---|---|
| WO | 2013083197 A1 | 6/2013 |
| WO | 2014014326 A1 | 1/2014 |
| WO | 2014092612 A1 | 6/2014 |

OTHER PUBLICATIONS

Author Unknown, "Technical Specification Group Services and System Aspects; Feasibility study for Proximity Services (ProSe) (Release 12)," Technical Report 22.803, Version 12.2.0, 3GPP Organizational Partners, Jun. 2013, 45 pages.
Author Unknown, "Technical Specification Group Radio Access Network; Evolved Universal Terrestrial Radio Access (E-UTRA); Requirements for support of radio resource management (Release 12)," Technical Specification 36.133, Version 12.7.0, 3GPP Organizational Partners, Mar. 2015, 1,014 pages.
Non-Final Office Action for U.S. Appl. No. 14/796,516, dated May 10, 2016, 12 pages.
Final Office Action for U.S. Appl. No. 14/796,516, dated Nov. 10, 2016, 13 pages.
Notice of Allowance for U.S. Appl. No. 14/796,516, dated Jan. 23, 2017, 5 pages.
Non-Final Office Action for U.S. Appl. No. 15/593,823, dated Sep. 5, 2017, 11 pages.
Final Office Action for U.S. Appl. No. 15/593,823, dated Feb. 13, 2018, 17 pages.
Advisory Action for U.S. Appl. No. 15/593,823, dated May 4, 2018, 4 pages.
Notice of Allowance for U.S. Appl. No. 15/593,823, dated Jul. 10, 2018, 5 pages.
Requisition by the Examiner and Search Report for Canadian Patent Application No. 2,957,765, dated Jan. 11, 2018, 3 pages.
Notification of Reasons for Refusal and Search Report for Japanese Patent Application No. 2017-507423, dated May 15, 2018, 36 pages.
International Search Report and Written Opinion for International Patent Application No. PCT/IB2015/055918, dated Nov. 17, 2015, 12 pages.
International Preliminary Report on Patentability for International Patent Application No. PCT/IB2015/055918, dated Feb. 23, 2017, 8 pages.
Non-Final Office Action for U.S. Appl. No. 16/162,481, dated Jan. 10, 2019, 7 pages.
Final Office Action for U.S. Appl. No. 16/162,481, dated Jun. 19, 2019, 16 pages.
Advisory Action for U.S. Appl. No. 16/162,481, dated Aug. 23, 2019, 6 pages.
Decision to Grant for Japanese Patent Application No. 2017-507423, dated Mar. 20, 2019, 6 pages.
Office Action for Argentinian Patent Application No. P150102595, dated Dec. 27, 2019, 3 pages.
Examination Report for European Patent Application No. 15756997.1, dated Feb. 26, 2019, 9 pages.
Examination Report for European Patent Application No. 15756997.1, dated Jan. 7, 2020, 9 pages.
Examination Report for European Patent Application No. 15756997.1, dated Sep. 3, 2020, 6 pages.

METHOD OF SHARING A UE RECEIVER BETWEEN D2D AND CELLULAR OPERATIONS BASED ON ACTIVITY

RELATED APPLICATIONS

This application is a continuation of patent application Ser. No. 16/162,481, filed Oct. 17, 2018, now U.S. Pat. No. 10,536,987, which is a continuation of patent application Ser. No. 15/593,823, filed May 12, 2017, now U.S. Pat. No. 10,129,924, which is a continuation of patent application Ser. No. 14/796,516, filed Jul. 10, 2015, now U.S. Pat. No. 9,661,684, which claims the benefit of provisional patent application Ser. No. 62/035,664, filed Aug. 11, 2014, the disclosures of which are hereby incorporated herein by reference in their entireties.

TECHNICAL FIELD

Embodiments of the present disclosure relate to the field of wireless communication, and more specifically to methods of sharing a User Equipment device (UE) receiver between Device-to-Device (D2D) and cellular operations.

BACKGROUND

Device-to-Device (D2D) communication in a cellular communications network is receiving a significant amount of interest, particularly with respect to next and future generation networks. D2D communication is communication between a source device and a target device, where both the source device and the target device are wireless devices (e.g., User Equipment devices (UEs) in 3$^{rd}$ Generation Partnership Project (3GPP) terminology). Some of the potential advantages of D2D communication include off-loading of the cellular network, faster communication, increased awareness of surrounding wireless devices of interest (e.g., running the same application), higher-quality links due to a shorter distance, etc. Some appealing applications of D2D communications are video streaming, online gaming, media downloading, Peer-to-Peer (P2P), file sharing, etc.

A D2D capable wireless device (e.g., a D2D capable UE) may be simultaneously configured to: (1) receive cellular signals on the Downlink (DL) carrier frequency and (2) receive D2D signals of other D2D capable wireless devices on the Uplink (UL) carrier frequency. The UL and DL carrier frequencies may belong to the same frequency band or to different frequency bands. The D2D capable wireless device may not be able to simultaneously receive both types of signals (i.e., cellular signals and D2D signals) due to a limited amount of receiver resources at the D2D capable wireless device. A receiver resource is characterized by radio front end resources (e.g., a Radio Frequency (RF) power amplifier, RF filters, etc.) and/or baseband resources (e.g., processors), memory, etc. This results in a scenario where the D2D capable wireless device can effectively use its receiver resources for only one of the two types of operations at a given time, i.e., the D2D capable wireless device can use its receiver resources for either D2D operation or for cellular operation at a given time.

The ability to receive only DL cellular signals or only D2D signals at a given time degrades the overall system performance. For example, the D2D capable wireless device may miss scheduling of data on a cellular link while receiving D2D signals. A network node (e.g., the serving base station of the D2D capable wireless device) will be unaware of the fact that D2D capable wireless device has missed certain data blocks on the cellular link due to D2D reception. Therefore, such missed packets/data blocks will be retransmitted to the D2D capable wireless device after missed reception is detected by the higher layer protocols, e.g. Radio Link Control (RLC), Internet Protocol (IP), etc. This increases the packet transmission delay and also degrades the link adaptation of the cellular DL scheduling channel (e.g., Physical Downlink Control Channel (PDCCH)). To compensate for the missed PDCCH, the network may increase the resources for PDCCH (e.g., control channel elements and/or transmit power). This in turn will consume more resources for PDCCH and will in turn reduce cellular DL capacity and/or increase interference on those resource elements.

In light of the discussion above, systems and methods are needed to avoid or minimize the loss of reception of data by a D2D capable wireless device on a cellular link as well as on a D2D link.

SUMMARY

Systems and methods are disclosed for utilizing non-overlapping time periods within one or more Discontinuous Reception (DRX) cycles configured for a Device-to-Device (D2D) capable wireless device for different types of operations. In some embodiments, these different types of operations are cellular and D2D operations such that the D2D capable wireless device performs cellular and D2D operations (e.g., reception of cellular and D2D signals) during non-overlapping time periods during one or more DRX cycles. In this manner, a D2D capable wireless device that, for example, can only receive one type of signal at a time is enabled to receive both cellular and D2D signals.

In some embodiments, a wireless device enabled to operate in a cellular communications network is configured to, or operable to, determine a first time period within a DRX cycle for cellular operation and a second time period within a DRX cycle for D2D operation, where the first time period and the second time period are non-overlapping time periods. The wireless device is further configured to perform a D2D operation during the first time period and a cellular operation during the second time period.

In some embodiments, the determination of the first time period and the second time period comprises one or more of: determining the first time period and the second time period based on a predefined rule, determining the first time period and the second time period autonomously, determining the first time period and the second time period based on a message received from another node, determining the first time period and the second time period based on a configuration received via higher-layer signaling, adapting one or both of the first time period and the second time period, and configuring one or both of the first time period and the second time period.

In some embodiments, the first time period is one of a DRX ON duration and a DRX OFF duration during a DRX cycle, and the second time period is another one of the DRX ON duration and the DRX OFF duration during the same DRX cycle.

In some embodiments, the wireless device is configured with a DRX cycle for Downlink (DL) cellular operation, the first time period is a DRX ON duration of the DRX cycle for DL cellular operation, and the second time period is a DRX OFF duration of the DRX cycle for DL cellular operation.

In some embodiments, the wireless device is configured with a common DRX cycle for both DL cellular operation and D2D operation, the first time period is one of a DRX OFF duration and a DRX ON duration of the common DRX cycle, and the second time period is another one of the DRX ON duration and the DRX OFF duration of the common DRX cycle. In some embodiments, the first time period is the DRX ON duration of the common DRX cycle, and the second time period is the DRX OFF duration of the common DRX cycle.

In some embodiments, the first time period is a first DRX ON duration of a first DRX cycle, and the second time period is a second DRX ON duration of a second DRX cycle.

In some embodiments, the first time period and the second time period are non-overlapping time periods within a DRX ON duration of a DRX cycle. In some embodiments, an amount of time during the DRX ON duration used for the first time period and an amount of time during the DRX ON duration used for the second time period are network configured. In some embodiments, an amount of time during the DRX ON duration used for the first time period and an amount of time during the DRX ON duration used for the second time period are decided by the wireless device autonomously.

In some embodiments, the first time period and the second time period are configured such that the first time period and the second time period are separated in time by a time (t) for which one or both of the following conditions hold:

$$Tmin \leq t \leq Tmax,$$

where Tmin is a predefined minimum amount of time and Tmax is a predefined maximum amount of time.

In some embodiments, the first time period and the second time period are configured such that a predefined order is maintained between the first time period and the second time period.

In some embodiments, the D2D operation performed during the first time period is reception of D2D signals, and the cellular operation performed during the second time period is reception of DL cellular signals.

In some embodiments, the first and second time periods are within the same DRX cycle. In some embodiments, the DRX cycle is one of a DL cellular DRX cycle and a common DRX cycle for both DL cellular and D2D operation.

In some embodiments, the first and second time periods are within different DRX cycles. In some embodiments, each of the different DRX cycles is one of a DL cellular DRX cycle and a common DRX cycle for both DL cellular and D2D operation.

Embodiments of a method of operation of a wireless device are also disclosed.

Embodiments of a network node of a cellular communications network are also disclosed. In some embodiments, the network is configured, or operable to, determine one or more DRX sharing rules for a wireless device, where the one or more DRX sharing rules define non-overlapping time periods within one or more DRX cycles to be used by the wireless device for cellular and D2D operations. The network node is further configured to configure the wireless device with the one or more DRX sharing rules.

In some embodiments, the network node is further operable to dynamically adapt the one or more DRX sharing rules for the wireless device.

In some embodiments, the non-overlapping time periods comprise a first time period for cellular operation and a second time period for D2D operation, and the one or more DRX sharing rules comprise a rule that the first time period is one of a DRX ON duration and a DRX OFF duration during a DRX cycle and the second time period is another one of the DRX ON duration and the DRX OFF duration during the same DRX cycle.

In some embodiments, the non-overlapping time periods comprise a first time period for cellular operation and a second time period for D2D operation, and the one or more DRX sharing rules comprise a rule that the first time period is a first DRX ON duration of a first DRX cycle and the second time period is a second DRX ON duration of a second DRX cycle.

In some embodiments, the non-overlapping time periods comprise a first time period for cellular operation and a second time period for D2D operation, and the one or more DRX sharing rules comprise a rule that the first time period and the second time period are non-overlapping time periods within a DRX ON duration of a DRX cycle.

In some embodiments, the non-overlapping time periods comprise a first time period for cellular operation and a second time period for D2D operation, and the one or more DRX sharing rules comprise a rule that the first time period and the second time period are configured such that the first time period and the second time period are separated in time by a time (t) for which one or both of the following conditions hold:

$$Tmin \leq t \leq Tmax,$$

where Tmin is a predefined minimum amount of time and Tmax is a predefined maximum amount of time.

In some embodiments, the non-overlapping time periods comprise a first time period for cellular operation and a second time period for D2D operation, and the one or more DRX sharing rules comprise a rule that the first time period and the second time period are configured such that a predefined order is maintained between the first time period and the second time period. In some embodiments, the network node determines the one or more DRX sharing rules for the wireless device based on one or more criteria, the one or more criteria comprising at least one of a group consisting of: an amount of cellular and/or D2D traffic, battery life and/or power consumption of the wireless device, DRX cycle length, length of ON duration, occasions of D2D operations, receiver capability of the wireless device, and activity state of the wireless device.

In other embodiments, a network node is configured to, or operable to, determine that a wireless device is configured or is being configured in DRX for receiving D2D and/or cellular signals; determine that the wireless device is sharing or is expected to share time during one or more DRX cycles for D2D operation and cellular operation; and, upon determining that the wireless device is configured or is being configured in DRX for receiving D2D and/or cellular signals and determining that the wireless device is sharing or is expected to share time during one or more DRX cycles for D2D operation and cellular operation, adapt an existing DRX cycle configuration or configure a new DRX cycle to enable the wireless device to share time during one or more DRX cycles for D2D operation and cellular operation.

In some embodiments, adaptation of the existing DRX cycle configuration or configuration of a new DRX cycle comprises adaptation of a DRX ON duration of the one or more DRX cycles.

In some embodiments, the adaptation of the existing DRX cycle configuration or configuration of a new DRX cycle is based on one or more criteria comprising of at least occasions of D2D operations.

In some embodiments, adaptation of the existing DRX cycle configuration or configuration of a new DRX cycle comprises adaptation of at least one of a predefined minimum amount of time and a predefined maximum amount of time between non-overlapping time periods within one or more DRX cycles for D2D and cellular operations.

In some embodiments, adaptation of the existing DRX cycle configuration or configuration of a new DRX cycle comprises adaptation of an ordering of non-overlapping time periods within one or more DRX cycles for D2D and cellular operations.

Embodiments of a method of operation of a network node are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
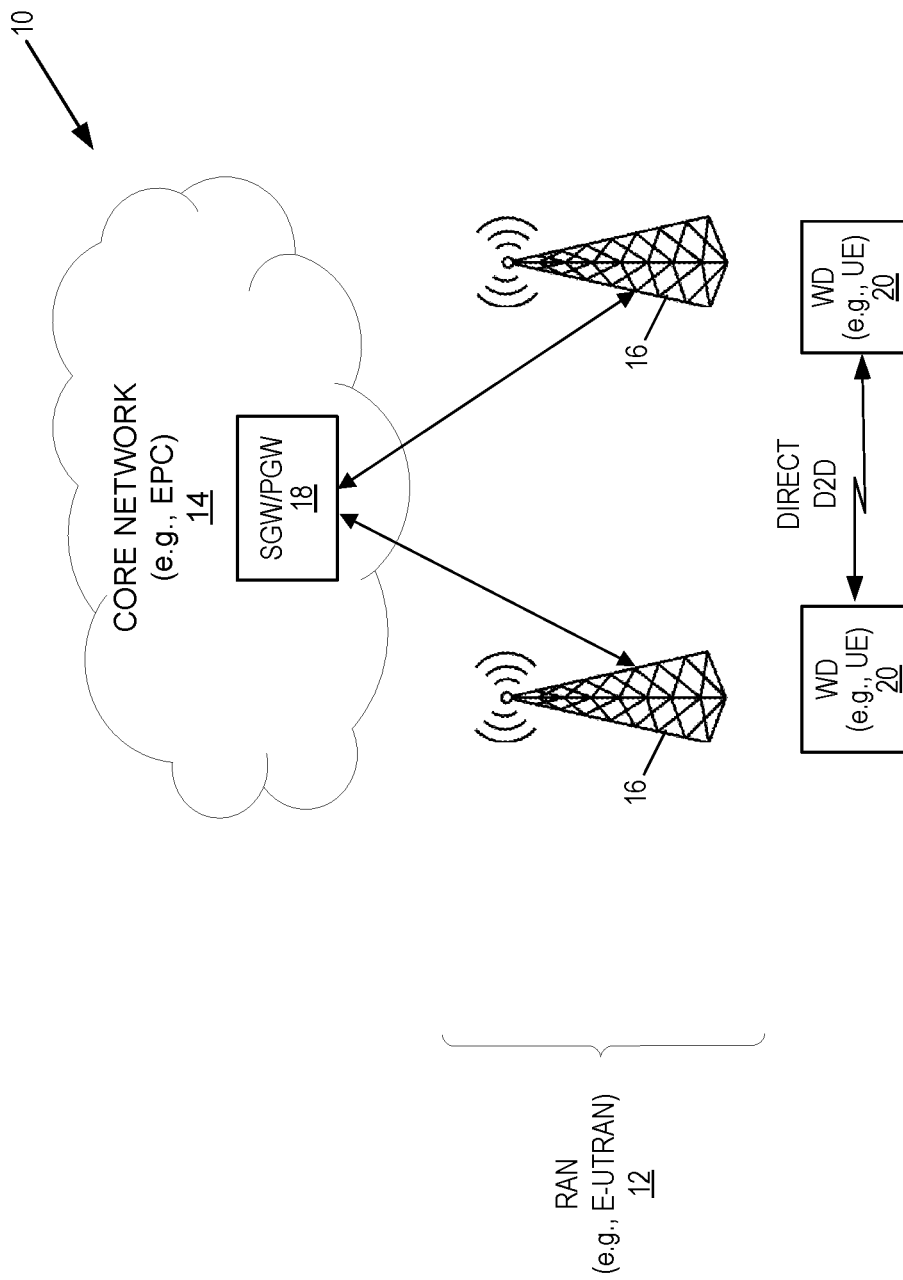
FIG. 1 illustrates direct Device-to-Device (D2D) communication between two wireless devices via a direct D2D link in a cellular communications network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the following description, numerous specific details are set forth. However, it is understood that embodiments of the disclosure may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The present disclosure relates to systems and methods for utilizing non-overlapping time periods within one or more Discontinuous Reception (DRX) cycles configured for a Device-to-Device (D2D) capable wireless device (also referred to herein as a D2D wireless device or sometimes a D2D User Equipment device (UE)) for cellular and D2D operations. Before proceeding, a description of some terminology that is used throughout this disclosure is beneficial.

An electronic device (e.g., an end station or a network device) stores and transmits (internally and/or with other electronic devices over a network) code (composed of software instructions) and data using machine-readable media, such as non-transitory machine-readable media (e.g., machine-readable storage media such as magnetic disks, optical disks, read only memory, flash memory devices, and phase change memory) and transitory machine-readable transmission media (e.g., electrical, optical, acoustical, or other form of propagated signals—such as carrier waves and infrared signals). In addition, such electronic devices include hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the disclosure may be implemented using different combinations of software, firmware, and/or hardware.

As used herein, a network device or apparatus (e.g., a router, a switch, or a bridge) is a piece of networking equipment, including hardware and software, which communicatively interconnects other equipment on the network (e.g., other network devices and end stations). Some network devices are "multiple services network devices" that provide support for multiple networking functions (e.g., routing, bridging, switching, Layer 2 aggregation, session border control, Quality of Service (QoS), and/or subscriber management), and/or provide support for multiple application services (e.g., data, voice, and video). Subscriber end stations (e.g., servers, workstations, laptops, netbooks, palm tops, mobile phones, smartphones, multimedia phones, Voice over Internet Protocol (VoIP) phones, UE, terminals, portable media players, Global Positioning System (GPS) units, gaming systems, and set-top boxes) access content/services provided over the Internet and/or content/services provided on Virtual Private Networks (VPNs) overlaid on (e.g., tunneled through) the Internet. The content and/or services are typically provided by one or more end stations (e.g., server end stations) belonging to a service or content provider or end stations participating in a Peer-to-Peer (P2P) service, and may include, for example, public webpages (e.g., free content, store fronts, or search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art will realize that any network device, end station, or other network apparatus can perform the functions described herein.

D2D: As used herein, the terms D2D, Proximity Service (ProSe), and even "P2P" communication may be used interchangeably.

D2D Device: As used herein, a D2D device, or interchangeably called a D2D wireless device or D2D UE in some embodiments herein, is any device capable of at least receiving or transmitting radio signals on a direct radio link, i.e., between the D2D device and another D2D device or entity. A D2D device (or D2D-capable device) may also be comprised in a cellular UE, a Personal Digital Assistant (PDA), a laptop, a mobile phone, a sensor, a relay, a D2D relay, or even a small base station (e.g., a low power or small cell base station) employing a UE-like interface. A D2D device, or D2D-capable device, is able to support at least one D2D operation.

D2D Operation: As used herein, a D2D operation may comprise any action or activity related to D2D, e.g., transmitting or receiving a signal/channel type for D2D purposes, transmitting or receiving data by means of D2D communication, transmitting or receiving control or assistance data for D2D purposes, transmitting or receiving a request for control or assistance data for D2D, selecting a D2D operation mode, initiating/starting D2D operation, switching to a D2D operation mode from a cellular operation mode, or configuring a receiver or a transmitter with one or more parameters for D2D. D2D operation may be for a commercial purpose or to support public safety, using the data related to D2D. D2D operation may or may not be specific to a certain D2D service.

D2D Receive Operation: As used herein, a D2D receive operation may be comprised in a D2D operation which may, in one example, also involve other than D2D receive operations.

Cellular Operation: As used herein, a cellular operation (by a wireless device or UE) may comprise any action or activity related to a cellular network (any one or more Radio Access Technologies (RATs)). Some examples of a cellular operation may be a radio signal transmission, a radio signal reception, performing a radio measurement, and performing a mobility operation or Radio Resource Management (RRM) related to a cellular network.

D2D Transmission: As used herein, a D2D transmission is any transmission by a D2D device. Some examples of D2D transmission are physical signals or physical channels, dedicated or common/shared signals, e.g., a reference signal, a synchronization signal, a discovery channel, a control channel, a data channel, a broadcast channel, a paging channel, Scheduling Assignment (SA) transmissions, etc. A D2D transmission on a direct radio link is intended for receiving by another D2D device. A D2D transmission may be a unicast, groupcast, or broadcast transmission. A D2D transmission may be on the Uplink (UL) time-frequency resources of a wireless communication system.

Coordinating Node: As used herein, a coordinating node is a node that schedules; decides, at least in part; or selects time-frequency resources to be used for at least one of: cellular transmissions and D2D transmissions. The coordinating node may also provide the scheduling information to another node such as another D2D device, a cluster head, a radio network node such as an enhanced or evolved Node B (eNB), or a network node (e.g., a core network node). The coordinating node may communicate with a radio network node.

Radio Spectrum: Although at least some of the embodiments are described for D2D transmissions in the UL spectrum (e.g., Frequency Division Duplexing (FDD)) or UL resources (e.g., Time Division Duplexing (TDD)), the embodiments disclosed herein are not limited to the usage of UL radio resources, neither to licensed nor unlicensed spectrum, or any specific spectrum at all.

Cellular Network: A cellular network, which is interchangeably referred to herein as a cellular communications network, may comprise, e.g., a Long Term Evolution (LTE) network (e.g., FDD or TDD), a Universal Terrestrial Radio Access (UTRA) network, a Code Division Multiple Access (CDMA) network, WiMAX, a Global System for Mobile Communications (GSM) network, or any network employing any one or more RATs for cellular operation. The description of many of the embodiments provided herein focuses on LTE and, as such, LTE terminology is oftentimes used; however, the embodiments described herein are not limited to the LTE RAT.

RAT: Example RATs include, e.g., LTE (FDD or TDD), GSM, CDMA, Wideband CDMA (WCDMA), WiFi, Wireless Local Area Network (WLAN), WiMAX, etc.

Network Node: As used herein, a network node may be a radio network node or another network node. Some examples of a radio network node are a radio base station, a relay node, an access point, a cluster head, a Radio Network Controller (RNC), etc. The radio network node is comprised in a wireless communications network and may also support cellular operation. Some examples of a network node which is not a radio network node include a core network node, a Mobility Management Entity (MME), a node controlling at least in part mobility of a wireless device, a Self-Organizing Network (SON) node, an Operations and Maintenance (O&M) node, a positioning node, a server, an application server, a D2D server (which may be capable of some but not all D2D-related features), a node comprising a ProSe function, a ProSe server, an external node, or a node comprised in another network.

Multiple Carrier Frequencies: Multiple carrier frequencies may refer to any combination of: different carrier frequencies within the same frequency band or within different frequency bands, the same Public Land Mobile Network (PLMN) or different PLMNs, and the same RAT or different RATs. D2D operation may or may not occur on dedicated carrier frequencies. Downlink (DL) and UL carrier frequencies in FDD are also examples of different carrier frequencies. A frequency band herein may be FDD, TDD, Half Duplex FDD (HD-FDD), or even unidirectional (e.g., a DL-only band such as Band 29, in some examples).

D2D Communication: As used herein, D2D communication is communication over a D2D link between at least a source D2D device and a target D2D device. The D2D communication may be over a direct D2D link between the source and destination D2D devices or over a locally routed D2D link between the source and destination D2D devices.

Direct D2D Link: As used herein, a direct D2D link is a link between a source D2D device and a target D2D device that does not pass through any intermediate nodes (i.e., the link is directly from the source D2D device to the target D2D device) (see FIG. 1 as an example).

Locally Routed D2D Link: As used herein, a locally routed D2D link is a link between a source D2D device and a target D2D device that passes through a common radio access node without passing through the core network (see FIG. 2 as an example).

Figure 2:
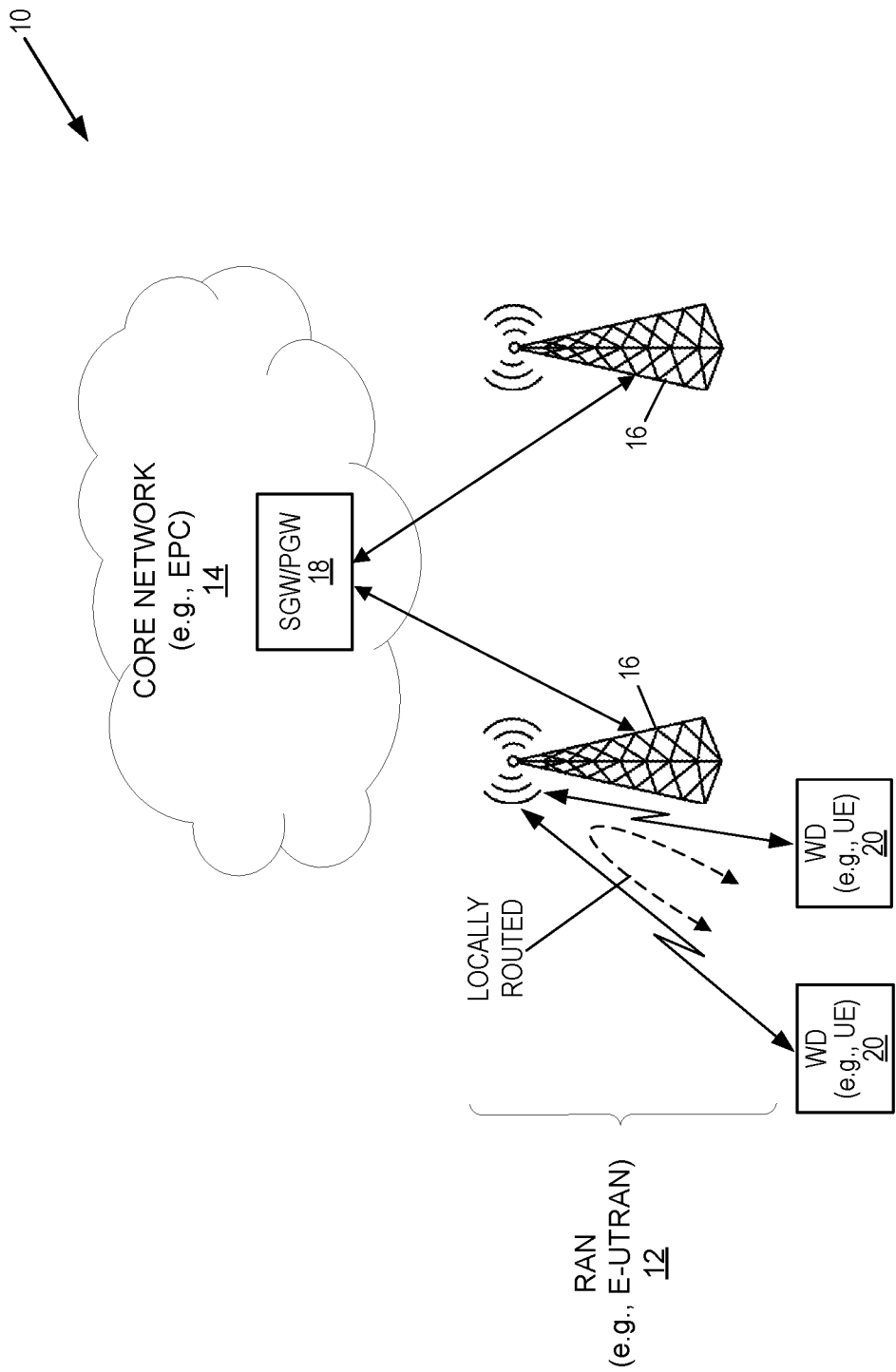
FIG. 2 illustrates locally routed D2D communication between two wireless devices via a locally routed D2D link in a cellular communications network.
Figure 3:
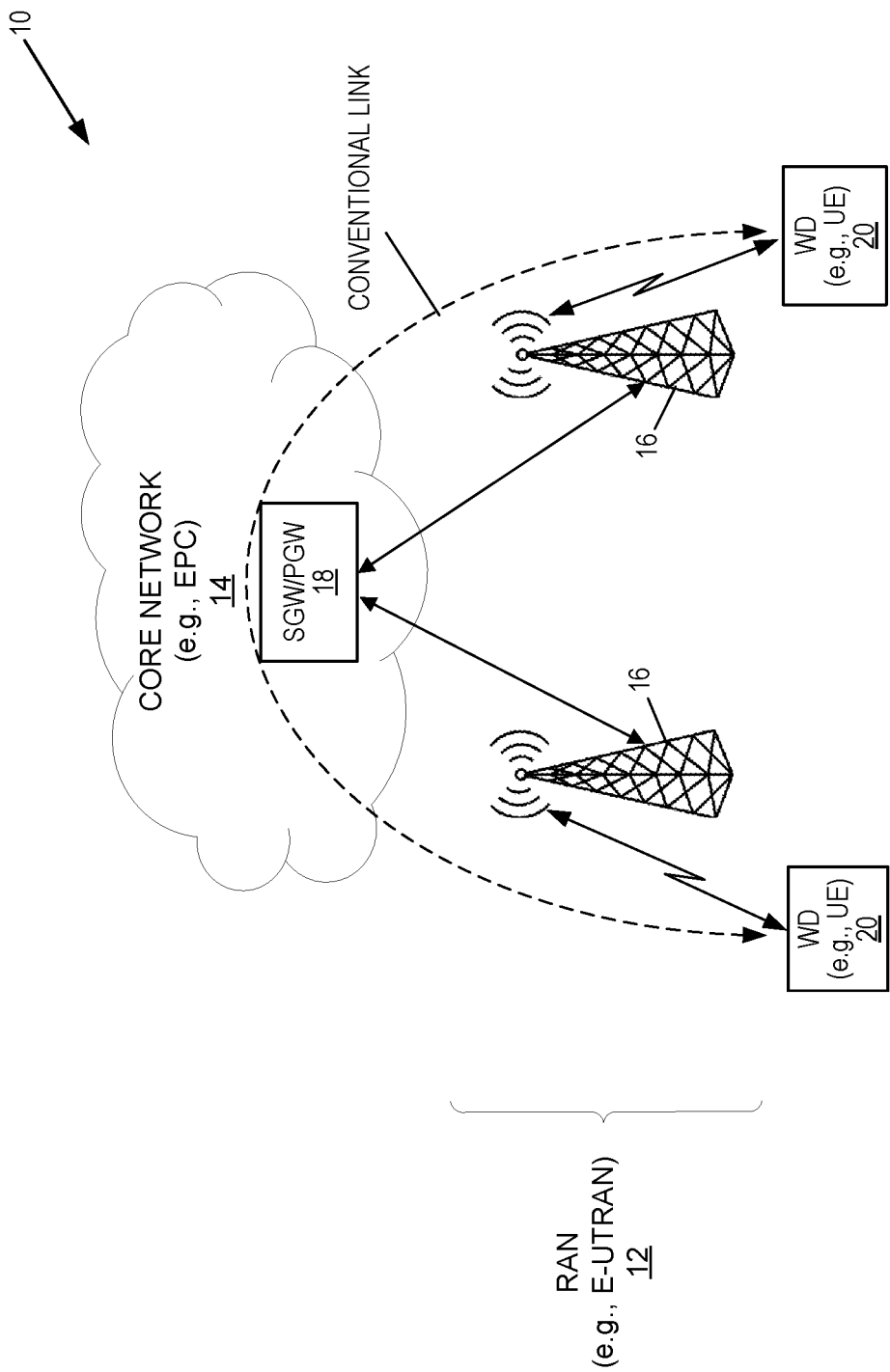
FIG. 3 illustrates conventional cellular communication between two wireless devices in a cellular communications network.

FIGS. 1 and 2 illustrate examples of D2D communication in a cellular communications network 10. In contrast, FIG. 3 illustrates conventional communication between two wireless devices in the cellular communications network 10. Specifically, as illustrated in FIGS. 1 through 3, the cellular communications network 10 includes a Radio Access Network (RAN) 12 (e.g., an Enhanced or Evolved Universal Terrestrial Radio Access Network (E-UTRAN)) and a core network 14 (e.g., an Enhanced or Evolved Packet Core (EPC)). The RAN 12 includes a number of base stations 16, which in 3$^{rd}$ Generation Partnership Project (3GPP) LTE are eNBs. Note that the base stations 16 are only examples of nodes in the RAN 12, which are referred to herein as radio network nodes or radio access nodes. Other examples of radio network nodes include Remote Radio Heads (RRHs), etc. The core network 14 includes a number of core network nodes, which in this example include a Serving Gateway (SGW)/Packet, or Packet Data Network, Gateway (PGW) 18.

FIG. 1 illustrates direct D2D communication (i.e., a direct data path) between two wireless devices 20 (e.g., UEs) via a direct D2D link. In contrast, FIG. 2 illustrates locally routed D2D communication between the two wireless devices 20 via a locally routed D2D link. As shown, the locally routed D2D communication is routed through the base station 16 without passing through the core network 14. In other words, a D2D transmission (i.e., the data path) from one of the wireless devices 20 is transmitted from that wireless device 20 to the base station 16 and then transmitted from the base station 16 to the other wireless device 20 without passing through the core network 14. In contrast to the D2D communication of FIGS. 1 and 2, FIG. 3 illustrates conventional cellular communication between the two wireless devices 20 where a transmission from the source wireless device 20 is transmitted from the source wireless device 20 to the base station 16 serving the source wireless device 20, from the base station 16 serving the source wireless device 20 through the core network 14 to the base station 16 serving the target or destination wireless device 20, and then from the base station 16 serving the target or destination wireless device 20 to the target/destination wireless device 20.

Figure 4:
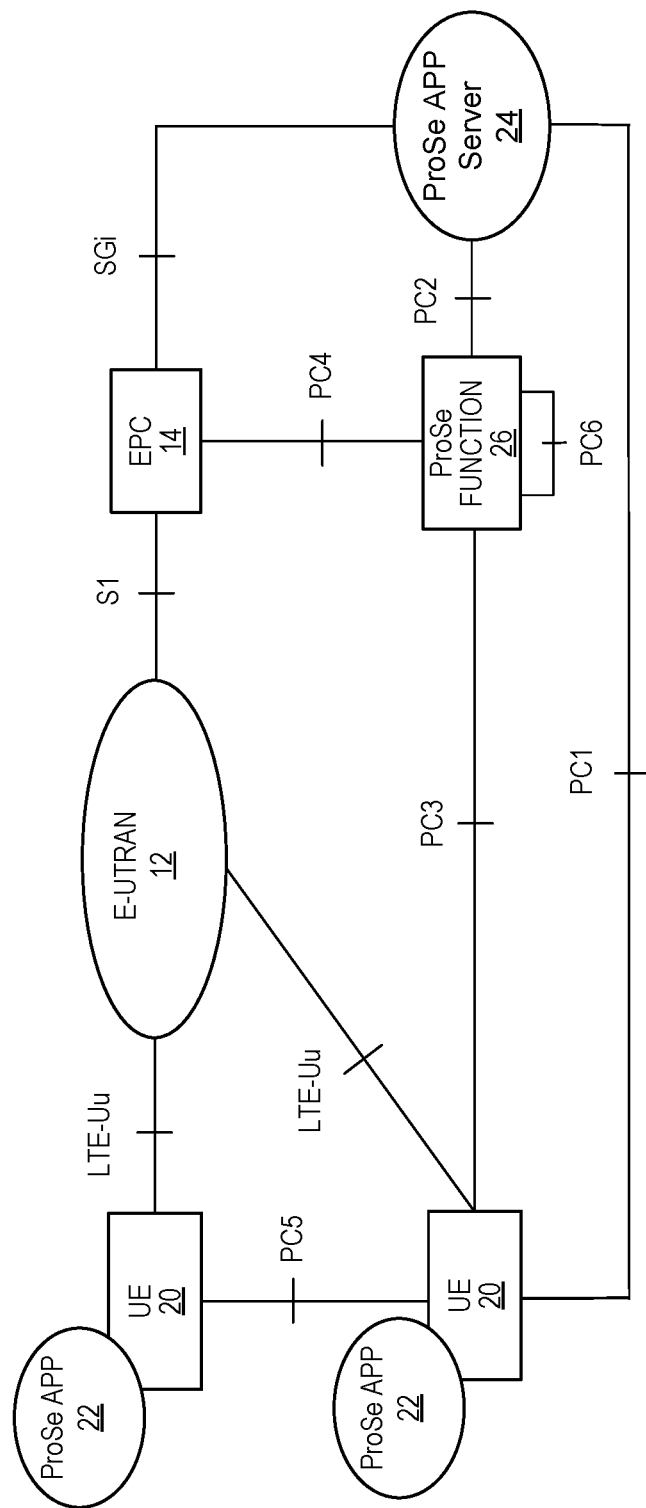
FIG. 4 illustrates one example of a D2D architecture for a cellular communications network.

An example of a D2D architecture including the interfaces between the various nodes is illustrated in FIG. 4. In this example, the architecture is a 3GPP LTE architecture and, as such, LTE terminology is used. As illustrated, the UEs 20 are connected to the E-UTRAN 12 via corresponding LTE-Uu interfaces. The E-UTRAN 12 is connected to the EPC 14 via an S1 interface. The UEs 20 include ProSe Applications (APPs) 22 that enable D2D communication between the UEs 20 via a direct D2D link. This direct D2D link is provided via an interface referred to in FIG. 4 as a PC5 interface. The direct D2D link may use uplink time and/or frequency resources of the E-UTRAN 12, DL time and/or frequency resources of the E-UTRAN 12, or time and/or frequency resources that are not utilized by the E-UTRAN 12 (e.g., an unlicensed spectrum). In this example, one of the UEs 20 is also connected to a ProSe APP server 24 and a ProSe function 26 via interfaces referred to in FIG. 4 as PC1 and PC3 interfaces, respectively. The ProSe APP server 24 and the ProSe function 26 may provide server-side functionality related to the D2D communication between the UEs 20. In some embodiments, the communication for the PC1 and PC3 interfaces is transported over the E-UTRAN 12 and the EPC 14 but is transparent to the E-UTRAN 12 and the EPC 14. The EPC 14 is connected to the ProSe APP server 24 via a SGi interface and connected to the ProSe function 26 via a PC4 interface. The ProSe APP server 24 and the ProSe function 26 are connected via a PC2 interface. Lastly, the ProSe function 26 may use a PC6 interface for communication between internal components of the ProSe function 26.

Systems and methods relating to sharing of non-overlapping time periods in DRX for different operations (i.e., cellular and D2D operations) are provided. Before describing embodiments of the present disclosure, a discussion of DRX is beneficial.

In LTE, DRX has been introduced as one of the key solutions to conserve battery power the wireless device (or UE) 20. DRX is characterized by the following:

Per UE mechanism (as opposed to per radio bearer);

May be used in RRC_IDLE and RRC_CONNECTED. In RRC_CONNECTED, the eNB/UE may initiate the DRX mode when there are no outstanding/new packets to be transmitted/received. In RRC_IDLE state (aka idle mode), Second Generation (2G) and Third Generation (3G) terminals use DRX to increase battery life time. High Speed Packet Access (HSPA) and LTE have introduced DRX also for RRC connected state.

Available DRX cycle values are controlled by the network and start from non-DRX up to x seconds where x can be 2.56 seconds in LTE and 5.12 seconds in UTRA.

Hybrid Automatic Repeat Request (HARQ) operation related to data transmission is independent of DRX operation and the UE wakes up to read the Physical Downlink Control Channel (PDCCH) for possible retransmissions and/or Acknowledgement/Negative Acknowledgement (ACK/NAK) signaling regardless of DRX. In the DL, a timer is used to limit the time the UE stays awake awaiting for a retransmission;

When DRX is configured, the UE may be further configured with an "on-duration" timer during which time the UE monitors the PDCCHs for possible allocations;

When DRX is configured, periodic Continuous Quality Improvement (CQI) reports can only be sent by the UE during the "active-time." Radio Resource Control (RRC) can further restrict periodic CQI reports so that they are only sent during the on-duration;

The eNB does not transmit packets to UE during the sleep mode.

RRC_CONNECTED mode DRX should not be confused with DRX in idle mode, which the UE is set into after a prolonged time of air interface inactivity. RRC_IDLE mode DRX is also known as paging DRX, i.e. the time the UE can go to sleep between two paging messages that could contain a command for the UE to wake up again and change back to RRC_CONNECTED state. RRC_IDLE mode DRX is much less fine grained and measured in hundreds of milliseconds or even seconds.

The following definitions apply to DRX in E-UTRAN:

on-duration: The "on-duration" (sometimes referred to herein as ON duration or DRX ON duration) is a duration in DL subframes that the UE waits for, after waking up from DRX, to receive PDCCHs. If the UE successfully decodes a PDCCH, the UE stays awake and starts an inactivity timer.

inactivity timer: The "inactivity timer" is a duration in DL subframes that the UE waits to successfully decode a PDCCH, from the last successful decoding of a PDCCH, failing which it re-enters DRX (DRX OFF state). The UE shall restart the inactivity timer following a single successful decoding of a PDCCH for a first transmission only (i.e., not for retransmissions).

active time: The "active time" is a total duration that the UE is awake. This includes the on duration of the DRX cycle, the time the UE is performing continuous reception while the inactivity timer has not expired, and the time UE is performing continuous reception while waiting for a DL retransmission after one HARQ Round Trip Time (RTT). Based on the above, the minimum active time is of length equal to the on duration, and the maximum active time is undefined (infinite).

Of the above parameters, the DRX ON duration and the inactivity timer are of fixed lengths, while the active time is of varying lengths based on scheduling decision and UE decoding success. Only on-duration and inactivity timer duration are signaled to the UE by the eNB.

There is only one DRX configuration applied in the UE 20 at any time. The UE 20 shall apply an ON duration upon wake-up from DRX sleep (i.e., DRX OFF state).

Figure 5:
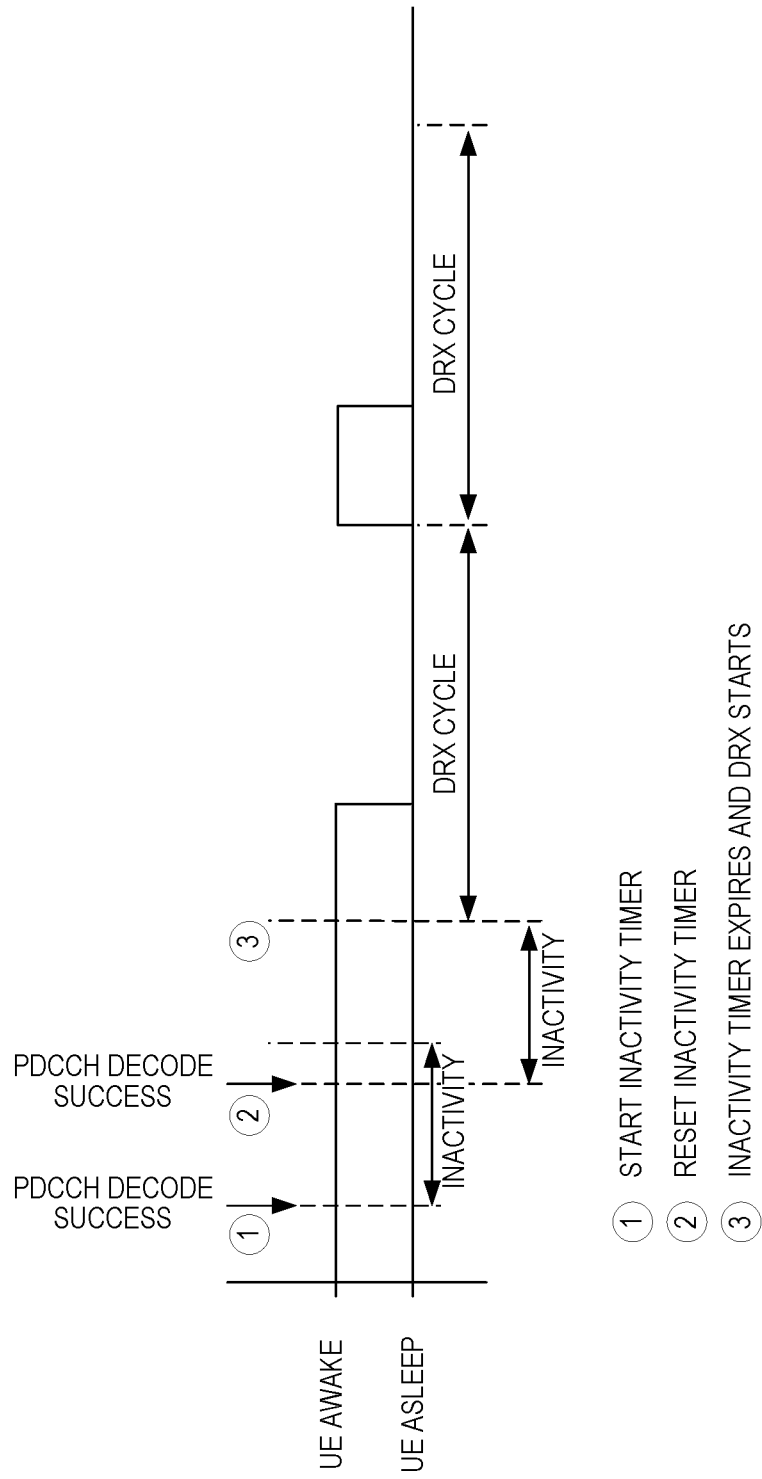
FIG. 5 illustrates one example of Discontinuous Reception (DRX) in Long Term Evolution (LTE)

DRX mode in LTE is illustrated in FIG. 5. DRX is triggered by means of an inactivity time known as DRX. As can be seen from FIG. 5, the UE 20 activity time may be extended if a PDCCH is received during the DRX ON duration. However, it may also be shortened by a Medium Access Control (MAC) DRX command, upon reception of which the UE 20 stops the DRX ON duration timer and DRX inactivity timer. In the particular example illustrated in FIG. 5, the UE 20 is initially awake (i.e., in DRX ON state). Before the DRX ON duration has expired, the UE 20 successfully decodes a PDCCH and, in response, starts the inactivity timer. Before the inactivity timer has expired, the UE 20 successfully decodes another PDCCH and, in response, resets the inactivity timer. This time, the inactivity timer expires before any new PDCCH is successfully decoded by the UE 20. As such, the UE 20 enters DRX. In particular, when the inactivity timer is not running, the UE 20 begins a DRX cycle by remaining in the DRX ON state for the DRX ON duration. When no PDCCH is successfully decoded by the UE 20 during the DRX ON duration, the UE 20 transitions to the DRX OFF state, where the UE 20 is asleep. The UE 20 remains in the DRX OFF state until the next DRX cycle begins.

Embodiments disclosed herein are directed to:

Embodiments of the UE 20 and methods of operation thereof for sharing time between different operation types in DRX;

Embodiments of a network node (e.g., the base station or eNB 16 or some other network node) and methods of operation thereof for adapting DRX to enable DL cellular and/or D2D operations;

Embodiments of a network node (e.g., the base station or eNB 16 or some other network node) and methods of operation thereof to enable DL cellular and/or D2D operations; and Embodiments of the UE 20 and methods of operation thereof for signaling capability related to sharing time between different operation types on DRX.

As an exemplary advantage to embodiments described herein, a D2D capable UE (e.g., the UE 20) that cannot receive D2D and cellular signals at the same time is configured by a network node (e.g., the eNB 16) with a DRX cycle(s) for enabling the UE to perform D2D and cellular operations during non-overlapping times during the DRX cycle(s). The UE may further be configured with one of the time sharing mechanisms or rules for performing both D2D and cellular operations during non-overlapping times during the DRX cycle(s).

According to some embodiments, a method is disclosed comprising obtaining a rule (e.g., autonomous selection, predefined or configured by a network node) to be used by the UE 20 to perform D2D and cellular operations over non-overlapping times of a DRX cycle, which DRX cycle is configured or being configured at the UE 20; determining a first time period and a second time period within a DRX cycle, wherein said first and second time periods do not overlap in time, and said first and second time periods are used for D2D operation and cellular operation respectively; and performing D2D operation and cellular operation during the determined first and second time periods respectively.

Other embodiments are directed to a method performed in a network node serving a D2D capable UE (e.g., the UE 20), comprising determining based on one or more criteria a rule to be used by the UE for performing D2D and cellular operations over non-overlapping times of a DRX cycle configured or being configured at the UE; configuring the UE with the determined rule, said rule enabling the UE to determine a first time period and a second time period within a DRX cycle, wherein said first and second time periods do not overlap in time, and said first and second time periods are used for D2D operation and cellular operation respectively; and, according to one exemplary embodiment, adapting based on one or more criteria the DRX cycle configuration to enable the UE to perform D2D and cellular operations over non-overlapping times.

It is noted that the "first" and the "second" non-overlapping times do not have to imply any specific order, according to various embodiments. One of ordinary skill in the art will realize that various communication nodes (e.g., a UE or any other station) could perform the processes described herein.

Embodiments of a UE and Methods of Operation Thereof for Sharing Time Between Different Operation Types in DRX As discussed above, embodiments of a method of operation of the UE 20, which is a D2D capable UE or D2D UE, to share time between different operation types (e.g., cellular and D2D operations) in DRX are disclosed. In these embodiments, the UE 20 is assumed to be configured by a network node (e.g., the base station or eNB 16 or some other network node) with at least one DRX cycle for D2D operation, at least one DRX cycle (another DRX cycle) for DL cellular operation, or the same (common) at least one DRX cycle for both D2D and DL cellular operations. The UE 20 configured with a DRX cycle(s) receives a radio signal during the ON duration of the DRX cycle(s). The UE 20 splits time during the DRX cycle(s) for D2D operation and cellular operation such that the D2D and cellular operations do not occur at the same time. The D2D operation (transmit and/or receive) may be scheduled in one or more of the following ways: configured by UE 20 autonomously (e.g., at least some scheduling-related parameters are decided by the UE 20), configured by another UE 20, or configured by a network node (e.g., the eNB 16). A D2D configuration may explicitly indicate resources (e.g., subframes, Resource Blocks (RBs), symbols, time slots, etc.) allocated for a D2D operation. Thus, in the description below, adapting D2D operation may also imply adapting the D2D configuration in some embodiments.

The splitting of time during DRX between D2D and cellular operations is governed according to any one or more of the following exemplary rules or principles.

Exemplary Rule #1—Using ON and OFF Durations: In some exemplary embodiments or implementations, the UE 20 receives only one of the two types of signals (DL cellular or D2D) at a time during the ON duration of a configured DRX cycle, and receives the other type of signal during the OFF period of the same DRX cycle (i.e., outside the ON duration) provided that the other type of signal is available during the OFF duration. For example, the UE 20 may receive cellular signals and D2D signals during the ON duration and OFF duration of the DRX cycle (e.g., receive cellular signals during the ON duration and receive D2D signals during the OFF duration, or vice versa).

Figure 6:
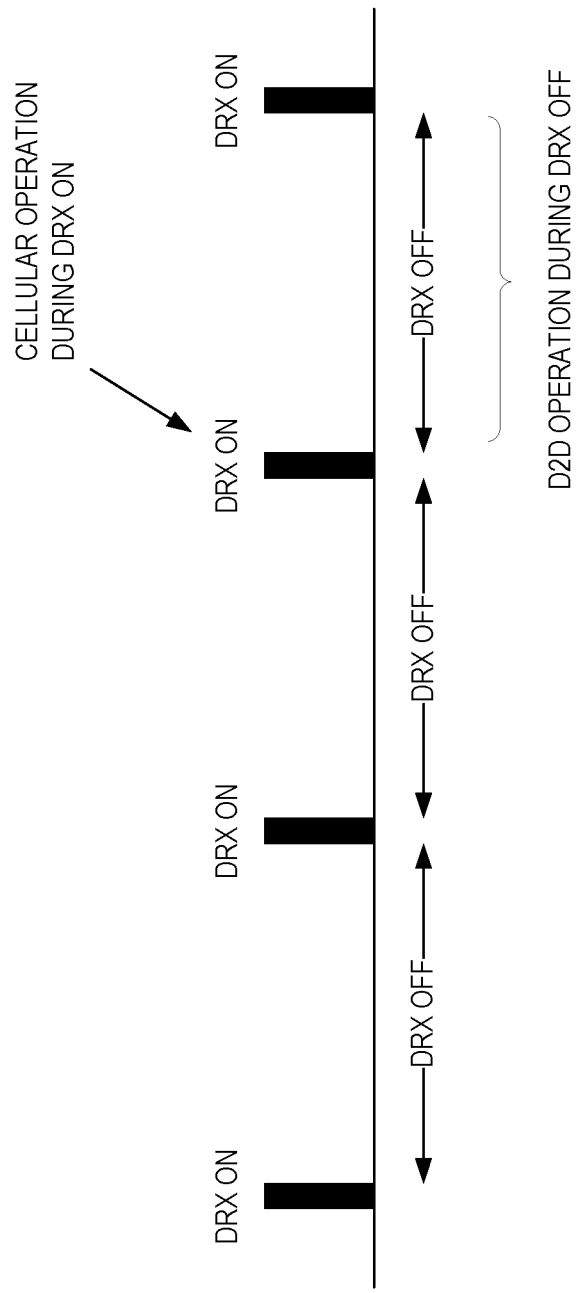
FIGS. 6 through 8 graphically illustrate sharing non-overlapping time periods of DRX for cellular and D2D operations according to some embodiments of the present disclosure.

One example of exemplary rule #1 is illustrated in FIG. 6. FIG. 6 illustrates multiple consecutive DRX ON durations and OFF durations. Each DRX ON duration and the corresponding DRX OFF duration form a DRX cycle. The consecutive DRX cycles may be referred to herein as a DRX pattern, which includes multiple consecutive DRX cycles each having a corresponding DRX ON duration and a DRX OFF duration. In this example, the UE 20 performs cellular operation(s) (e.g., reception of cellular signals) during the DRX ON duration and performs D2D operation(s) (e.g., reception of D2D signals) during the DRX OFF duration.

Exemplary rule #1 is further elaborated with a few examples. In a first example, the UE 20 is configured with a DRX cycle for only DL cellular operation. As an example, the DRX cycle is 640 milliseconds (ms) with an ON duration of 20 ms. The UE 20 therefore receives DL cellular signals during the ON duration of the configured DRX cycle. In existing solutions, the UE 20 can receive the D2D signals at any time including during the ON duration of the DRX cycle. However, according to this embodiment, the UE 20 receives only DL cellular signals during the ON duration, but the UE 20 receives the D2D signals during the OFF duration of the DRX cycle. Typically, D2D signals (e.g., synchronization signals, beacon signals, discovery signals, etc.) are transmitted periodically.

In a second example, the UE 20 is configured with a common DRX cycle for both DL cellular operation and D2D operation. As an example, the DRX cycle is also 640 ms with an ON duration of 20 ms. The UE 20, based on autonomous decision, decides to receive only DL cellular signals during the ON duration of the configured DRX cycle. In existing solutions, the UE 20 will not be able to receive the D2D signals during the same ON duration where the DL cellular signal is received and, therefore, no D2D signal reception will take place. However, according to this embodiment, the UE 20 will also attempt to receive the D2D signals during the OFF duration of the DRX cycle. If the D2D signals are available, then the UE 20 receives them. In this way, the performances of both DL cellular and D2D operations are enhanced.

Exemplary Rule #2—Sharing Different ON Durations: In some other exemplary embodiments or implementations, the UE 20 may receive both types of signals, but in different ON durations (e.g., DL cellular during the ON duration of one DRX cycle and D2D signals during the ON duration of the next DRX cycle and so on). In another example, the UE 20 may receive cellular signals in three out of four consecutive ON durations of corresponding consecutive DRX cycle whereas the UE 20 may receive D2D signals in the remaining one out of four consecutive ON durations of the corresponding consecutive DRX cycles.

Figure 7:
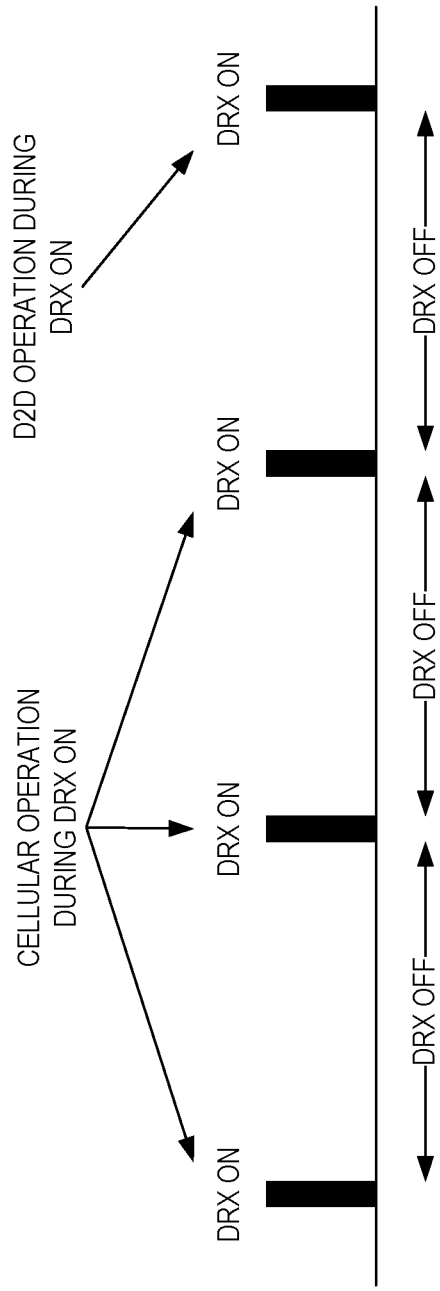

One example of exemplary rule #2 is illustrated in FIG. 7. This example is further explained as follows. Assume that the UE 20 is also configured with a common DRX cycle for both DL cellular operation and D2D operation. The DRX cycle is the same as in previous examples. The UE 20, based on an indication received from a network node, decides to receive DL cellular signals during three out of any four consecutive DRX ON durations and D2D signals during the remaining one out of four DRX ON durations. The UE 20 may also be informed about the three consecutive DRX ON durations for receiving DL cellular and/or the DRX ON duration for receiving the D2D signals. The UE 20 may also determine the DRX ON duration to be used for DL cellular or D2D based on a predefined rule, e.g., initially three DRX ON durations after receiving the indication from the network node. The UE 20 therefore receives DL cellular and D2D signals during different DRX ON durations. In this way, the UE 20 is able to receive both types of signals. In existing solutions, the UE 20 will miss one of the two types of signals in this scenario comprising of common DRX cycles. In order to compensate for an inability to schedule the DL cellular signals in certain ON durations, for example the network node may assign more resources (e.g., more RBs, larger data block size, etc.) to the UE 20 during the ON durations used for DL cellular signals. In this way, the UE 20 throughput can be maintained and performance degradation can be avoided.

Figure 8:
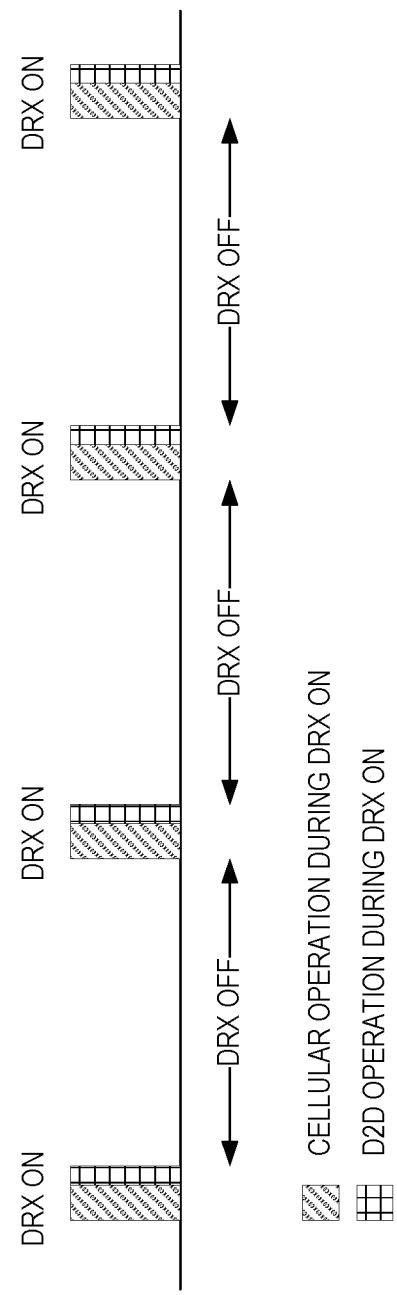

Exemplary Rule #3—Sharing the same ON duration: In some embodiments or implementations, the UE 20 may receive both types of signals during the same ON duration but during non-overlapping times (e.g., receive DL cellular signals during an initial 70% of the ON duration and receive D2D signals during the remaining 30% of the same ON duration). This example is illustrated in FIG. 8. Such a decision may be made by the UE 20 autonomously or be network controlled, e.g., a network node may allow or not allow such sharing or, if it is allowed, the network node may also control the sequence and/or the amount of sharing (e.g., cellular first and then D2D; 50% for cellular and 50% for D2D, or 70% for cellular and 30% for D2D, etc.).

In one example, in case the sharing is not allowed or the time available for cellular DL (out of the 20 ms in this example) is above a threshold, the existing cellular requirements can apply. But if sharing is allowed by the network node or the time left for cellular DL during the DRX ON is below a threshold, either some adaptation in the UE 20 may be needed to ensure that the current cellular requirements are still met (since fewer subframes are now available for DL cellular) or a second set of requirements which are more relaxed compared to the case with no sharing applies for the DL cellular.

Exemplary Rule #4—Ensuring a certain minimum time (Tmin) and/or maximum time (Tmax) between the first and the second non-overlapping time periods: In some embodiments, the first and the second non-overlapping times are configured such that they are separated in time by a time (t) for which one or both of the following conditions hold:

$Tmin \leq t$, and $t \leq Tmax$.

In one example, the separation may be determined by a relation between D2D operation and DL cellular operation, e.g., the UE 20 receives some assistance or configuration for D2D operation via a cellular DL control channel (e.g., such as PDCCH or Enhanced or Evolved Physical Downlink Control Channel (EPDCCH)) or via DL higher-layer protocol (e.g., RRC) and thus the UE 20 may need some time to receive and process the received information (e.g., Tmin=4 ms).

In another example, the UE 20 may need to perform a D2D operation after no more Tmax after a cellular operation (e.g., receiving some D2D related data from the network), or vice versa, the UE 20 may need to trigger some cellular operation within Tmin after a D2D operation.

In yet another example, the minimum time spacing (Tmin) may be needed for receiver switching due to Radio Frequency (RF) aspects.

In yet another example, there may be Tmin1 needed due to a first reason (reason 1) and Tmin2 needed due to a second reason (reason 2), thus the resulting Tmin can be determined, e.g., as:

$Tmin=max(Tmin1,Tmin2)$.

In some embodiments, e.g. when the two reasons are associated with different D2D operations, the UE 20 may apply an additional condition that abs(Tmin2−Tmin1) <threshold (otherwise the two D2D operations may be performed in non-contiguous times, e.g., the first D2D operation during a first DRX OFF duration and the second D2D operation during a second DRX OFF duration).

Similarly, there may be Tmax1 needed due to a first reason (reason 1) and Tmax2 needed due to a second reason (reason 2), thus the resulting Tmax can be determined, e.g., as:

$Tmax=min(Tmax1,Tmax2)$.

In some embodiments, e.g. when the two reasons are associated with different D2D operations, the UE 20 may apply an additional condition that abs(Tmax2-Tmax1) <threshold (otherwise the two D2D operations may be performed in non-contiguous times, e.g., the first D2D operation during a first DRX OFF duration and the second D2D operation during a second DRX OFF duration).

Exemplary Rule #5—Ensuring a certain order between the first and the second non-overlapping times: In some embodiments, the first and the second non-overlapping times are configured in a certain order, e.g., the first non-overlapping time (for D2D operation) appears first in time followed by the second non-overlapping time (for cellular DL operation). In yet another example, the order may be the opposite, e.g., the second non-overlapping time appears in time before the first non-overlapping time.

In one example, the order may be determined, e.g., by a relation between the D2D operation and the cellular operation of the UE 20. For example, the UE 20 may need to receive a D2D configuration via cellular DL (e.g., RRC or PDCCH/EPDCCH) before it can perform the D2D operation based on that configuration.

Exemplary Rule #6—Combined Mechanism: In yet another example, the UE 20 may receive the types of signals by combining any two or more of the embodiments and examples described with respect to exemplary rules #1 through #5.

In the above examples, the UE 20 detects the DRX cycle configuration and deliberately adapts its radio receiver to be able to receive the two types of signals at non-overlapping times regardless of whether DRX is configured for receiving only one or both types of signals.

In some embodiments, any one of the above rules to be used by the UE 20 for splitting of time between D2D and DL cellular operations is decided by the UE 20 based on one or more of the following principles:

The UE 20 itself (autonomously) decides which rule(s) to use based on, e.g., UE battery life. If the UE battery life is above a threshold, then the UE 20 may choose exemplary rule #1 and operate D2D during the OFF duration. As another example, the criterion used by the UE 20 to decide which rule(s) to apply is the availability of D2D signals. If D2D signals are available during the ON duration only, then the UE 20 may use exemplary rule #2 or exemplary rule #3.

The rule(s) to use may be predefined. For example, in case there is only one specified rule in the standard, the UE 20 will use that rule. Yet another example of a predefined rule is that UE 20 uses a certain rule(s) depending on the DRX cycle length and/or ON duration of the DRX cycle. For example, if the DRX ON duration is above a threshold (e.g., more than 10 ms), only then does the UE 20 use exemplary rule #3. In yet another example of a predefined rule, the UE 20 may choose a rule depending upon the DRX cycle length, e.g., the UE 20 uses exemplary rule #1 in case the DRX cycle is larger than a threshold (e.g., 640 ms). A certain one or more rules may also apply when certain conditions are met and/or in certain scenarios and/or may be triggered by some events.

The rule(s) used by the UE 20 may be configured by a network node.

Any combination of the above. For example, a predefined rule applies always when a certain condition is met, but at least one parameter (e.g., a threshold) in that rule is configured by a network node or selected autonomously by the UE 20.

In case of autonomous decision by the UE 20 for selecting a rule(s) for DRX sharing, the UE 20 may also inform a network node and/or another UE 20 about the rule which is being or expected to be used by the UE 20. The UE 20 may also request a network node to provide the UE 20 with the values of one or more parameters related to the rule selected by the UE 20.

Even in case of autonomous decision or based on a predefined rule, one or more parameters to enable the sharing of time during the DRX cycle between D2D and DL cellular operations may still be configured at the UE 20 by a network node. Alternatively, the parameter values may be predefined or autonomously decided by the UE 20 itself. For example, the network node may indicate which one of the methods described herein (e.g., which one of exemplary rule #1 through exemplary rule #6) that the UE 20 may use for sharing the time between D2D and cellular operations. The network node may also indicate for example the amount of time within an ON duration to be split by the UE 20 between D2D and cellular operations in case of exemplary rule #3 described above.

Figure 9:
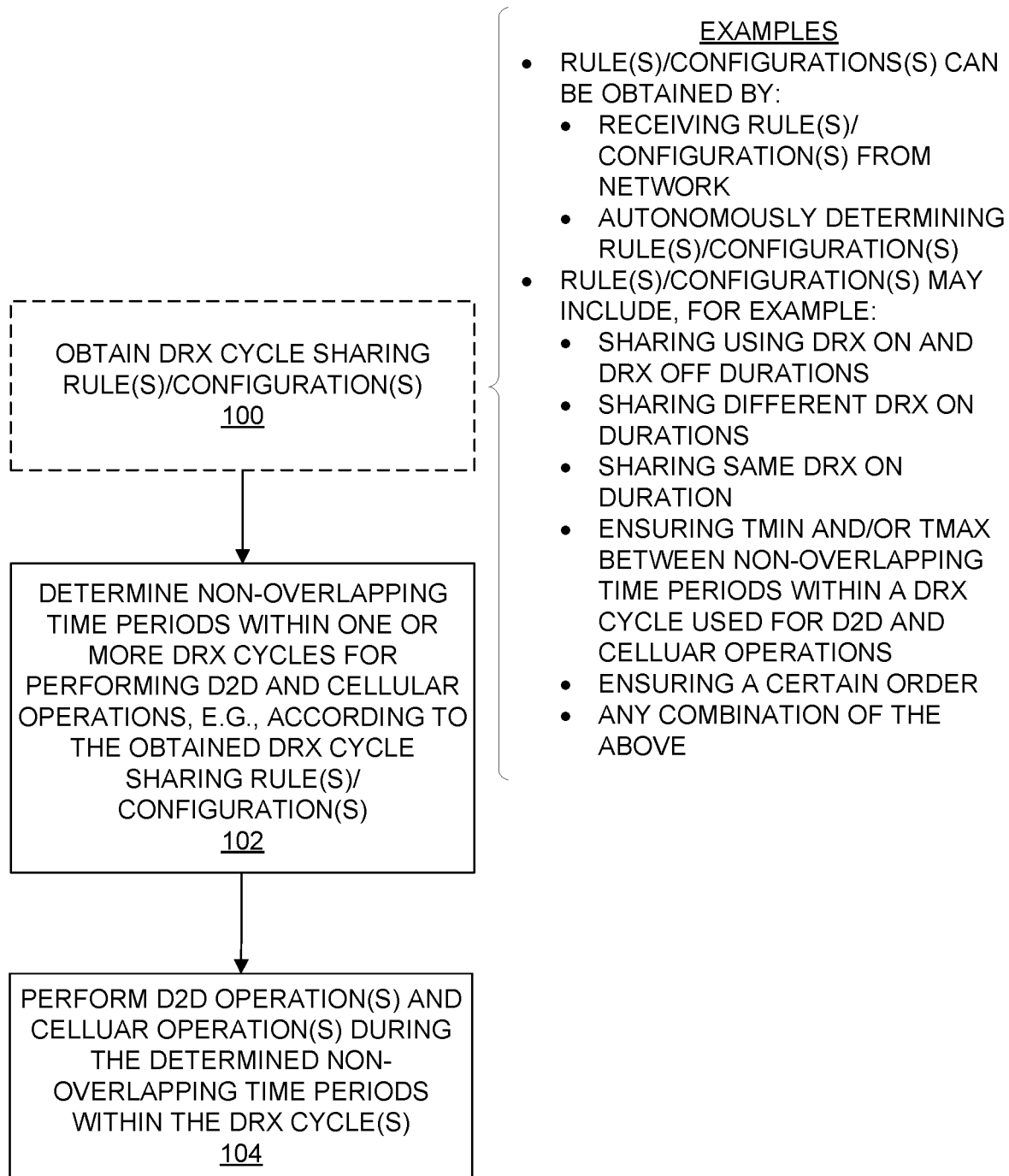
FIG. 9 is a flow chart that illustrates the operation of a wireless device to perform DRX sharing for cellular and D2D operations according to some embodiments of the present disclosure.

FIG. 9 is a flow chart that illustrates the operation of the UE 20 according to the embodiments described above. Note that while this process is described as being performed by the UE 20, this process may alternatively be performed by another node or processing unit communicatively coupled to the UE 20. As illustrated, optionally (i.e., in some embodiments), the UE 20 obtains one or more DRX cycle sharing rules/configurations (step 100). As discussed above, in some embodiments, the UE 20 determines the DRX sharing rule(s) autonomously. In other embodiments, the UE 20 receives an indication of the DRX sharing rule(s) from a network node. In yet another embodiment, the UE 20 obtains the DRX sharing rules via a combination of autonomous decision by the UE 20 and information received from a network node (e.g., determine which DRX sharing rule to apply autonomously but receive threshold or parameter values from the network node). As discussed above, the DRX sharing rule(s) may include: sharing using DRX ON and DRX OFF durations (i.e., exemplary rule #1), sharing different DRX ON durations (i.e., exemplary rule #2), sharing the same DRX ON duration (i.e., exemplary rule #3), ensuring Tmin and/or Tmax between non-overlapping time periods within a DRX cycle(s) used for D2D and cellular operations (i.e., exemplary rule #4), ensuring a certain order between D2D and cellular operations (i.e., exemplary rule #5), or any combination thereof (i.e., exemplary rule #6).

The UE 20 determines non-overlapping time periods within one or more DRX cycles for performing D2D and cellular operations, e.g., according to the obtained DRX cycle sharing rule(s) (step 102). For instance, the UE 20 determines a first time period within a DRX cycle for cellular operation(s) and a second time period within the same DRX cycle or a different DRX cycle (depending on the embodiment or DRX sharing rule) for D2D operation(s). The first and second time periods are non-overlapping such that the UE 20 is able to, e.g., receive both cellular signals and D2D signals even if/though the UE 20 is only capable of receiving one of these types of signals at a time.

The UE 20 then performs D2D operation(s) and cellular operation(s) during the determined non-overlapping time periods within the DRX cycle(s) (step 104). While not limited thereto, in some embodiments, the D2D operation(s) include reception of D2D signals, and the cellular operation(s) include reception of DL cellular signals.

Embodiments of a Network Node and Methods of Operation Thereof for Adapting DRX to Enable DL Cellular and/or D2D Operations In some embodiments, a network node (e.g., the eNB 16 or some other network node) serving a D2D capable UE 20, which is or is being configured with at least one DRX cycle, configures the UE 20 with one or more rules or one or more parameters associated with said rules to be used by the UE 20 for sharing the time between D2D and cellular operations during the DRX cycle. Some examples of such rules or mechanisms and their associated parameters are described below. The network node may configure the UE 20 only with one or more parameters of the rule(s) in case the UE 20 is already configured with the rule or the UE 20 uses the rule based on a predefined principle.

The network node may use one or more criteria to decide which rule should be used by the UE 20 for splitting the time of the DRX cycle for cellular and D2D operations. Examples of such criteria are:

UE D2D capability(-ies): For example, the criteria may include whether the UE 20 supports certain D2D operations in certain scenarios and/or under certain conditions.

Amount of cellular traffic such as buffer size of cellular and/or D2D: For example, if the size of a UE buffer (containing cellular traffic) for the UE 20 is larger than a threshold, then the network node may configure the UE 20 to use exemplary rule #1 (described above) so that the entire ON duration can be used for cellular operation.

UE battery life and/or power consumption: If UE battery life status of the UE 20 is below a threshold and/or expected power consumption by the UE 20 due to cellular and/or D2D operations is above a threshold, then the network node may use exemplary rule #2 or exemplary rule #3 (described above). This is to save UE battery life.

DRX cycle length: If DRX cycle length is above a threshold, then the network node may configure the UE 20 to use exemplary rule #1 (described above).

Length of ON duration of DRX cycle: If the DRX cycle length is above a threshold, then the network node may configure the UE 20 to use exemplary rule #3 only if the DRX ON duration is sufficiently larger, i.e. above a threshold, e.g., at least 20 ms.

Occasions of D2D operation: The network node may also take into account the occasions of D2D operation when selecting a rule. For example, if D2D signals can be received by the UE 20 during the OFF duration of the DRX cycle, then the network node may configure the UE 20 with exemplary rule #1.

UE radio receiver capability: For example, the network node may select any of the rules if the UE 20 has only one radio receiver or limited receiver capability (e.g., limited amount of processors and/or memory units, etc.) to receive only one of the two types of signals (D2D or cellular signals) at the same time. Otherwise, the network node may not select any of the rules since the UE 20 can receive both types of signals in the ON duration at the same time.

Relation between D2D operation and DL cellular operation for the UE: For example, the network node may consider whether the UE 20 is expected to receive some assistance data or a D2D configuration via a cellular link in order to perform the D2D operation.

UE state: For example, the network node may consider whether the UE 20 is in RRC_IDLE or RRC_CONNECTED, since the UE operation may be more restricted (in supported/allowed operation and also UE 20 configuration).

After the rule(s) for DRX sharing has been selected by the network node, the UE 20 is configured with the selected rule(s) and may further be configured with one or more parameters associated with the selected rule(s).

Figure 10:
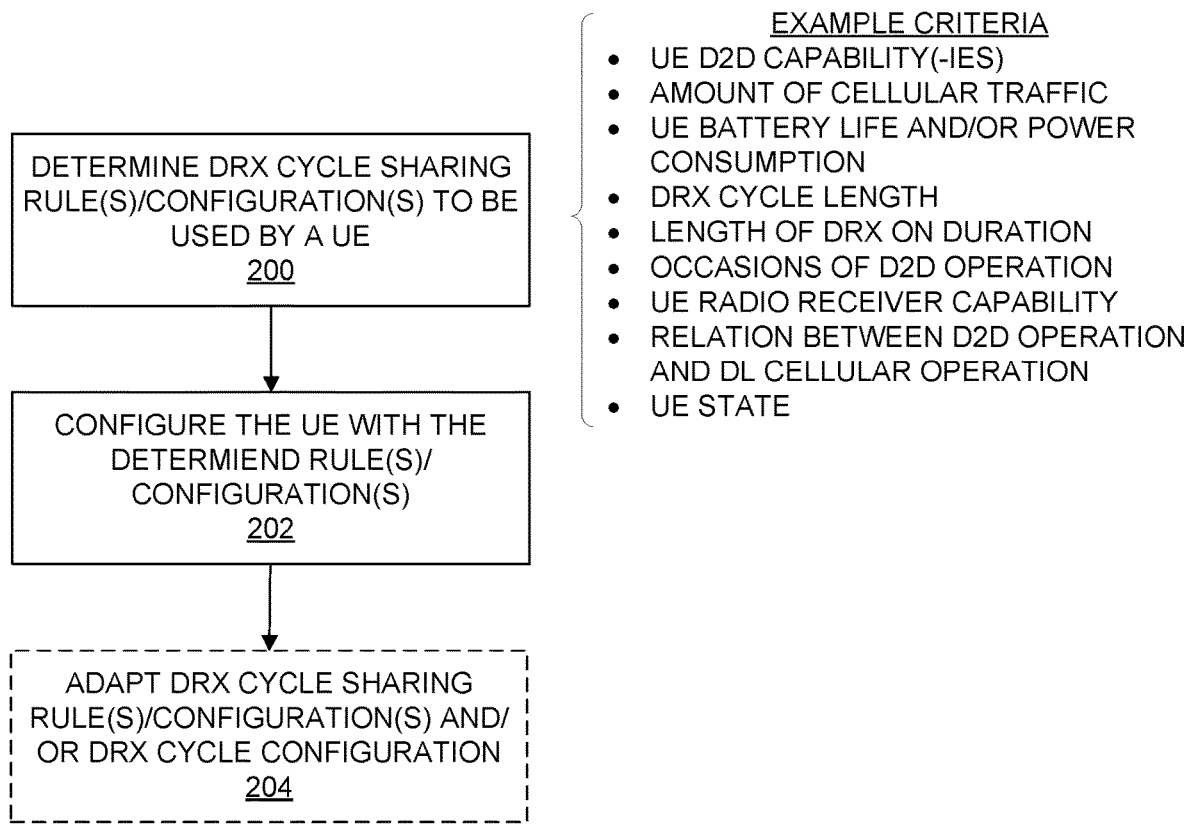
FIG. 10 is a flow chart that illustrates the operation of a network node to configure a wireless device for DRX sharing according to some embodiments of the present disclosure.

FIG. 10 is a flow chart that illustrates the operation of a network node according to at least some of the embodiments described above. As discussed above, the network node determines one or more DRX cycle sharing rules/configurations to be used by the UE 20 (step 200). As discussed above, the network node can use various criteria for this determination, depending on the particular embodiment or implementation. In particular, when determining the DRX cycle sharing rule(s) (sometimes referred to herein simply as rules or DRX sharing rules), the network node may consider one or more of the following: D2D capability(-ies) of the UE 20, amount of cellular traffic for the UE 20, battery life and/or (expected) power consumption of the UE 20, DRX cycle length, length of DRX ON duration, occasions of D2D operation, radio receiver capability(-ies) of the UE 20, relationship between D2D operation and DL cellular operation, and UE state of the UE 20, as described above.

The network node configures the UE 20 with the determined DRX cycle sharing rule(s) (step 202). This configuration may be performed using any suitable signaling (e.g., RRC signaling). Further, this configuration may include both the configuration of the DRX cycle sharing rule(s) and the configuration of any parameters utilized by the DRX cycle sharing rule(s). As discussed above, the DRX cycle sharing rule(s) enable the UE 20 to determine non-overlapping type periods within one or more DRX cycles during which to perform different types of operations (e.g., cellular and D2D operations).

Optionally, in some embodiments, the network node adapts the DRX cycle sharing rule(s) for the UE 20 and/or DRX cycle configuration (step 204). In some embodiments, the DRX cycle sharing rule(s) are adapted based on any suitable criteria such as, for example, any combination of one or more of the criteria discussed above with respect to step 200. Adaptation of the DRX cycle sharing rule(s) enables, e.g., dynamic adjustment of the DRX cycle sharing rule(s) in response to changing conditions. In some embodiments, in addition to or as an alternative to adapting the DRX sharing rule(s), the network node adapts the DRX cycle to enable the UE 20 to perform D2D and cellular operations over non-overlapping time periods. This type of adaptation is discussed below in more detail. However, in general, the DRX cycle may be adapted by adapting the DRX ON duration, adapting the DRX cycle based on occasions of D2D operations, and/or adapting the DRX cycle to satisfy Tmin and/or Tmax.

Embodiments of a Network Node and Methods of Operation Thereof to Enable DL Cellular and/or D2D Operations In some embodiments, the UE 20 is assumed to be configured or being configured by the network node with at least one DRX cycle for D2D operation and/or for cellular operation. The UE 20 is expected to share the time during the DRX cycle(s) between D2D and cellular operations, e.g., due to limited radio receiver capability. The network node may also deliberately configure the UE 20 with at least one DRX cycle to enable the UE 20 to share time between D2D and cellular operations, in case the UE 20 cannot receive D2D and cellular signals at the same time.

Figure 11:
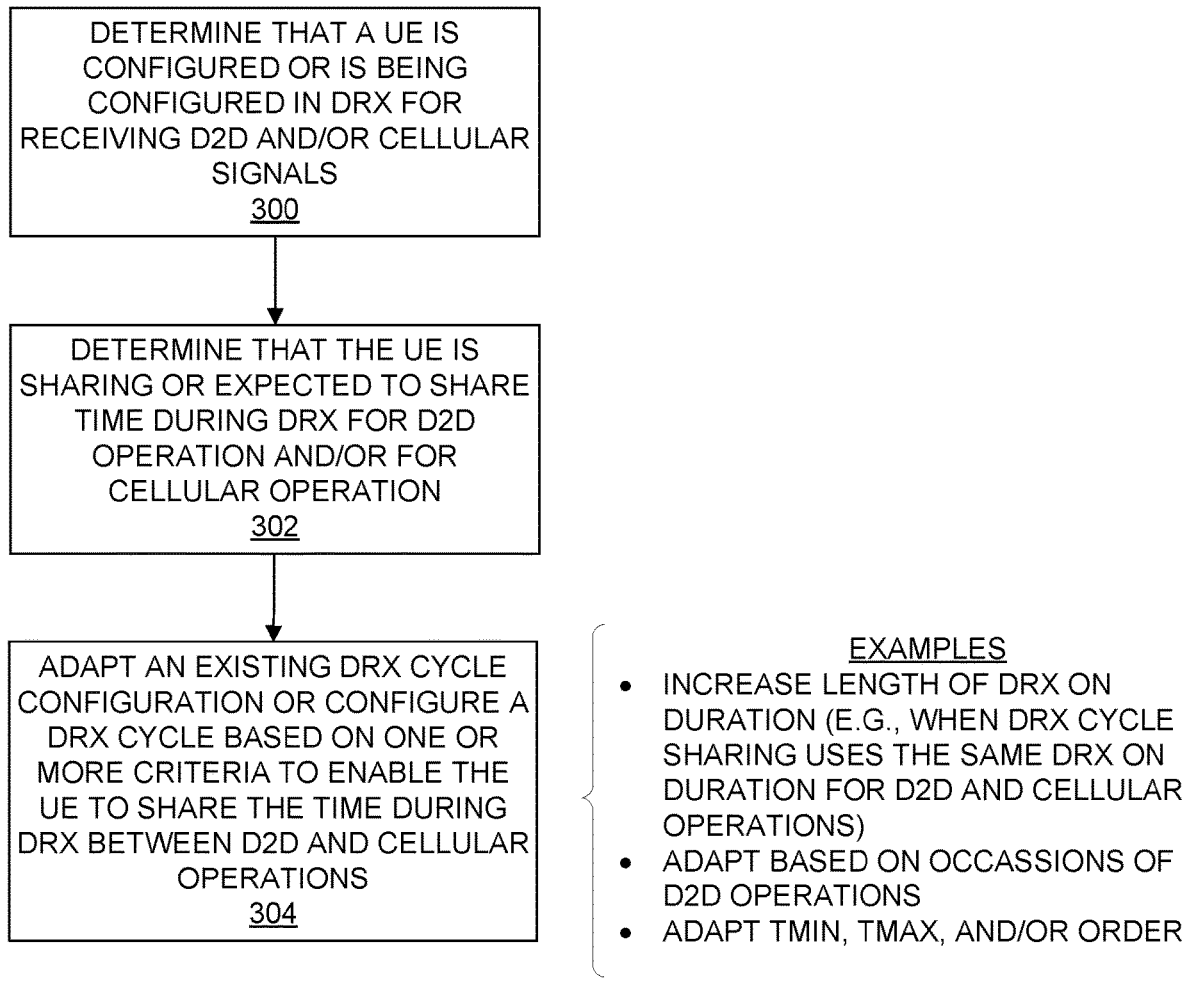
FIG. 11 is a flow chart that illustrates the operation of a network node to adapt DRX to enable DRX sharing by a wireless device for D2D and cellular operations according to some embodiments of the present disclosure.

The network node adapts the DRX configuration in order to facilitate the UE 20 to more effectively and efficiently share its radio receiver resource between D2D and cellular operations when operating in DRX. In some embodiments, a method of operation of a network node comprises the following steps, as illustrated in FIG. 11. The network node determines that the UE 20 is configured or being configured in DRX for receiving at least one of the D2D and cellular signals (step 300). The network node determines that the UE 20 is sharing or expected to share time during DRX for D2D operation and/or for cellular operation (step 302). For example, the network node may determine this based on UE radio receiver capability or an indication from the UE 20 that the UE 20 can only receive one of the two types of signals. The network node may also determine based on historical data or previous operation of the UE 20 that the UE 20 cannot receive both types of signals at the same time.

The network node adapts an existing DRX cycle configuration or configures a DRX cycle for the UE 20 based on one or more criteria to enable the UE 20 to share the time during the DRX between D2D and cellular operations (step 304). Examples of this adaptation include, but are not limited to:

Type of rule to be used: For example, in case the network node decides to use exemplary rule #3 (described above), then the network node may adapt (e.g., increase) the length of the ON duration.

Occasions of D2D operations: For example, the network node may determine the occasions when the UE 20 is expected to receive D2D signals. The network node may determine the D2D signal occasions based on one or more of: predefined information, indication received from another network node, or from the UE 20. The network node then configures the UE 20 with a DRX cycle or adapts DRX cycle parameter(s) so that the UE 20 can receive D2D signals. For example, in case of exemplary rule #1 (described above), the network node may extend or shift the start of the DRX cycle length in case the D2D signals partly or fully overlap with the current DRX cycle.

The DRX configuration parameters may also be adapted to Tmin and Tmax in exemplary rule #4 (described above) and/or the order of the D2D and cellular operations, if related, by exemplary rule #5 (described above), e.g., in case of jointly applying exemplary rule #3 and exemplary rule #4 the DRX ON period may be extended to adapt to Tmin.

Embodiments of a UE and Methods of Operation Thereof for Signaling Capability Related to Sharing Time Between Different Operation Types on DRX According to some embodiments, the UE 20 signals a capability to a network node or a second UE 20 indicating whether it is capable of sharing time of a DRX cycle(s) between D2D operation(s) and cellular operation(s) such that the UE 20 does not receive D2D and cellular signals during the same time. The UE capability information signaled to the network node or a second UE 20 may also indicate which one or more of the rules or principles (e.g., which of exemplary rules #1 through #6 described above) can be used by the UE 20 for sharing the time of the DRX cycle(s) between D2D operation and cellular operation. The capability may also apply for certain carrier frequencies/frequency bands and/or their combinations.

The UE 20 may signal the capability information to the network node autonomously, based on an explicit request received from the network node, triggered by an event or condition, together with other capabilities at joining a cell, or when indicating D2D-related capabilities to the network. The network node (e.g., an eNB or a core network node) or a second UE 20 may use the received UE capability information for one or more of the following purposes:

Transmit the capability information to another network node, e.g. any of: the eNB or the second UE 20 sends it to another eNB, the eNB or the second UE 20 sends it to a Core Network (CN) node (e.g., a MME or a ProSe server), the CN node sends it to the eNB, the eNB sends it to a third UE 20 (see, e.g., FIG. 2), etc.

Store the capability information in memory and retrieve it at a future time for use.

Decide, based on the capability information, which of the criteria or principles for sharing the time in DRX is to be employed for the UE 20.

Adapt cellular and/or D2D scheduling for the UE 20.

Adapt the D2D-related data and configuration broadcasted by the network.

Figure 12:
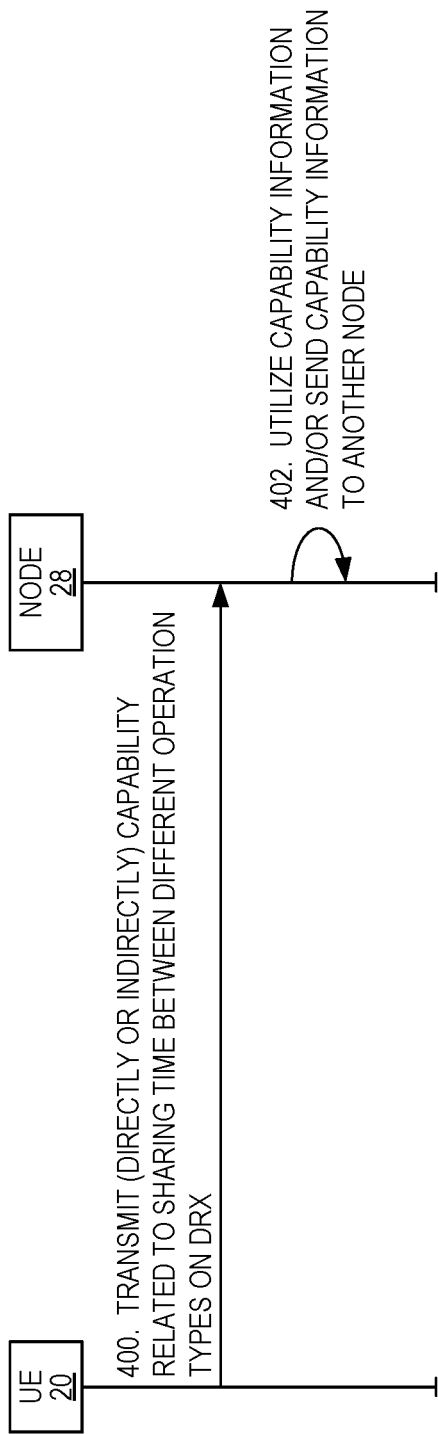
FIG. 12 illustrates the operation of a wireless device to transmit capability information related to the DRX sharing according to some embodiments of the present disclosure.

FIG. 12 illustrates the operation of the UE 20 to send capability information to a node according to some embodiments of the present disclosure. As illustrated, the UE 20 sends, or transmits, capability information related to sharing time between different operation types on DRX to another node 28 (step 400). This other node 28 may be a network node (e.g., the eNB 16) or another UE 20. The node 28 then utilizes the capability information and/or sends the capability information to another node (step 402). For example, as discussed above, in some embodiments the node 28 is a network node, and the network node utilizes the capability information to determine and/or adapt DRX sharing rule(s) and/or associated parameters for the UE 20. In other embodiments, the node 28 is another UE 20, and the node 28 sends the capability information to another node, e.g., a network node.

Figure 13:
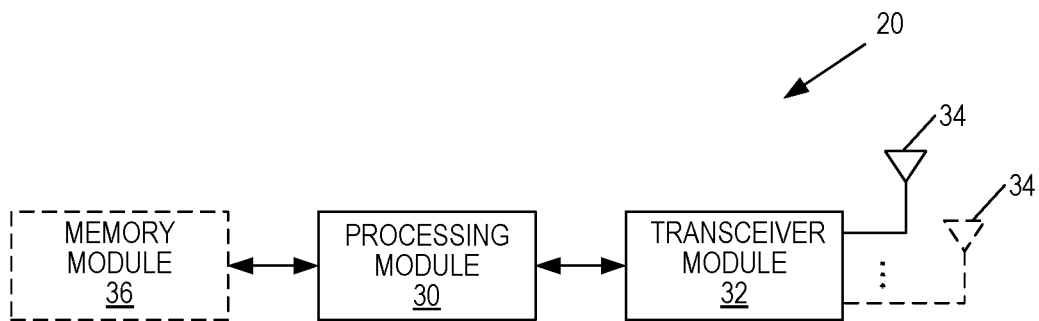
FIGS. 13 and 14 illustrate embodiments of a wireless device.

FIG. 13 is a block diagram of the UE 20, according to one exemplary embodiment, that can be used in one or more of the non-limiting example embodiments described herein. The UE 20 may in some embodiments be a mobile device that is configured for Machine-to-Machine (M2M) or Machine-Type Communication (MTC). The UE 20 comprises a processing module 30 that controls the operation of the UE 20. As will be appreciated by one of skill in the art, the processing module 30 includes one or more processors, or processor circuits, such as, for example, one or more microprocessors or Central Processing Units (CPUs), one or more Application Specific Integrated Circuits (ASICs), one or more Field Programmable Gate Arrays (FPGAs), or one or more other types processing circuits. The processing module 30 is connected to a receiver or transceiver module 32 with associated antenna(s) 34 which are used to receive signals from or both transmit signals to and receive signals from the base station 16 and other D2D capable UEs 20. To make use of DRX, the processing module 30 can be configured to deactivate the receiver or transceiver module 32 for specified lengths of time. The UE 20 also comprises a memory module 36 that is connected to the processing module 30 and that stores program and other information and data required for the operation of the UE 20. In some embodiments, the UE 20 may optionally comprise a satellite positioning system (e.g., GPS) receiver module (not shown) that can be used to determine the position and speed of movement of the UE 20.

In some embodiments, a computer program including instructions which, when executed by at least one processor, causes the at least one processor to carry out the functionality of the UE 20 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 14:
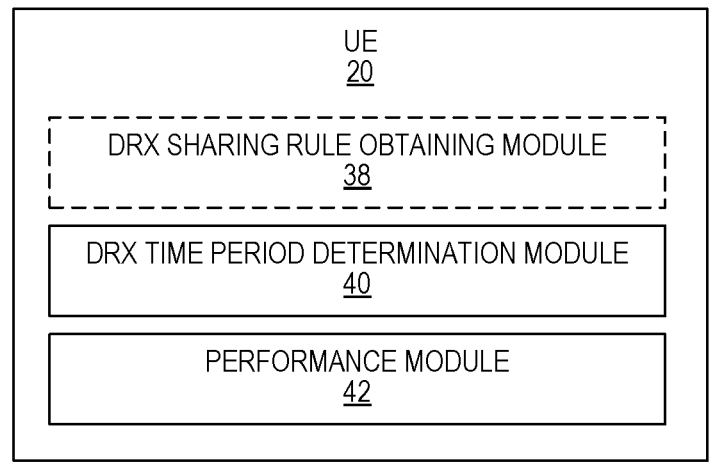

FIG. 14 is a block diagram of the UE 20 according to some other embodiments of the present disclosure. In this example, the UE 20 includes a DRX sharing rule obtaining module 38 (optional), a DRX time period determination module 40, and a performance module 42, each of which is, in this embodiment, implemented in software. The DRX sharing rule obtaining module 38 operates to obtain one or more DRX sharing rule(s) as described above. The DRX time period determination module 40 operates to determine the non-overlapping time periods for the different types of operations (e.g., cellular and D2D operations) e.g., based on the DRX sharing rule(s). The performance module 42 performs the different types of operations in the non-overlapping time periods, as described above.

Figure 15:
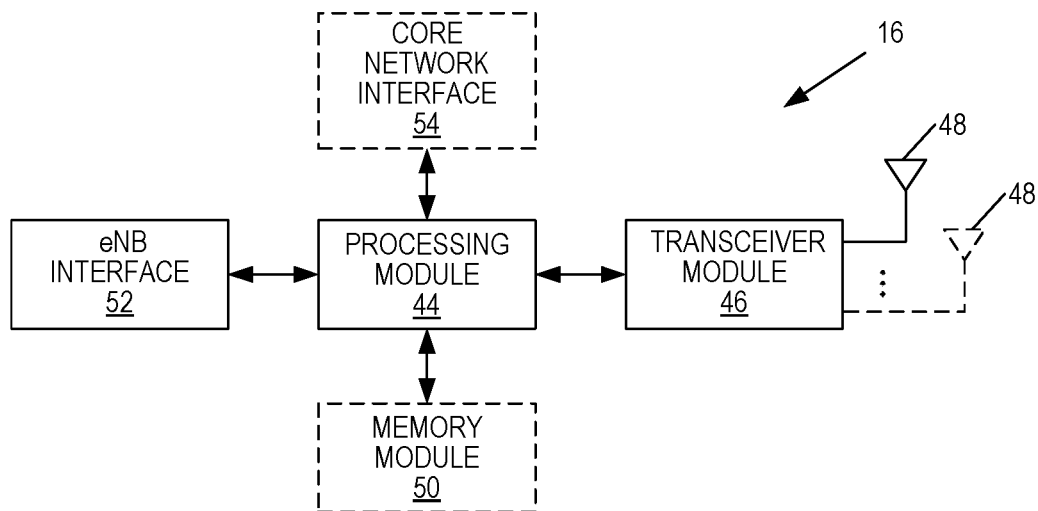
FIGS. 15 and 16 illustrate embodiments of a base station.

FIG. 15 shows the base station 16 (for example a Node B or an eNB) that can be used in example embodiments described herein. It will be appreciated that other types of network nodes will include similar components. It will also be appreciated that although a macro eNB will not in practice be identical in size and structure to a micro eNB, for the purposes of illustration, the base stations 16 are assumed to include similar components. Thus, the base station 16 comprises a processing module 44 that controls the operation of the base station 16. As will be appreciated by one of skill in the art, the processing module 44 includes one or more processors, or processor circuits, such as, for example, one or more microprocessors or CPUs, one or more ASICs, one or more FPGAs, or one or more other types processing circuits. The processing module 44 is connected to a transceiver module 46 with associated antenna(s) 48 which are used to transmit signals to, and receive signals from, UEs 20 in the cellular communications network 10. The base station 16 also comprises a memory module 50 that is connected to the processing module 44 and that stores program and other information and data required for the operation of the base station 16. The base station 16 also includes components and/or circuitry 52 for allowing the base station 16 to exchange information with other base stations 16 (for example via an X2 interface) and components and/or circuitry 54 for allowing the base station 16 to exchange information with nodes in the core network 14 (for example via the S1 interface). It will be appreciated that base stations for use in other types of networks (e.g., Universal Terrestrial Radio Access Network (UTRAN) or WCDMA RAN) will include similar components to those shown in FIG. 15 and appropriate interface circuitry 52, 54 for enabling communications with the other network nodes in those types of networks (e.g., other base stations, mobility management nodes, and/or nodes in the core network 14).

In some embodiments, a computer program including instructions which, when executed by at least one processor, causes the at least one processor to carry out the functionality of the base station 16 (or other network node) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 16:
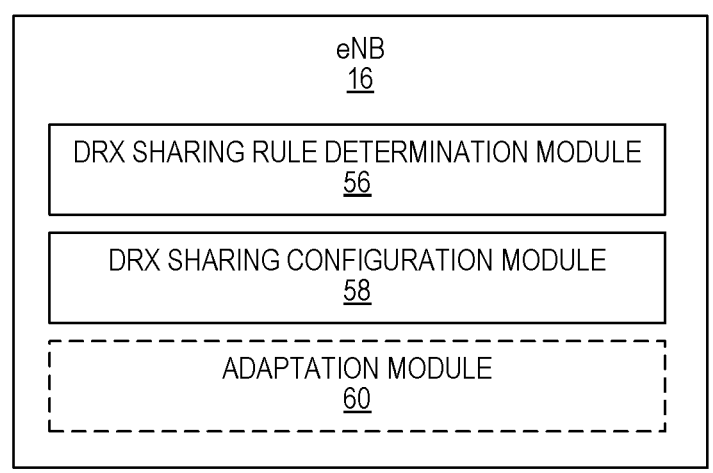

FIG. 16 is a block diagram of the base station 16 according to some other embodiments of the present disclosure. In this example, the base station 16 includes a DRX sharing rule determination module 56, a DRX sharing configuration module 58, and an adaptation module 60 (optional), each of which is, in this embodiment, implemented in software. The DRX sharing rule determination module 56 operates to determine one or more DRX sharing rule(s) to be used by the UE 20, as described above. The DRX sharing configuration module 58 operates to configure the UE 20 with the determined DRX sharing rule(s), as described above. The adaptation module 60 operates to, in some embodiments, adapt the DRX sharing rule(s) and/or the DRX configuration of the UE 20, as also described above.

As described herein, some exemplary, but non-limiting embodiments of the present disclosure are as follows. In some embodiments, a method comprises obtaining a rule to be used by a UE for performing D2D and cellular operations over non-overlapping times of a DRX cycle configured or being configured at the UE, determining a first time period and a second time period within a DRX cycle(s), wherein said first and second time periods do not overlap in time, and said first and second time periods are used for D2D operation and cellular operation respectively; and performing D2D operation and cellular operation during the determined first and the second time periods respectively. In some embodiments, this method is performed by the UE.

In some embodiments, a UE comprises a processing unit configured to perform the steps of: obtaining a rule to be used by the UE for performing D2D and cellular operations over non-overlapping times of a DRX cycle(s) configured or being configured at the UE; determining a first time period and a second time period within a DRX cycle(s), wherein said first and second time periods do not overlap in time, and said first and second time periods are used for D2D operation and cellular operation respectively; and performing D2D operation and cellular operation during the determined first and second time periods respectively.

In some embodiments, a method performed in a network node serving a D2D capable UE comprises determining, based on one or more criteria, a rule to be used by the UE for performing D2D and cellular operations over non-overlapping times of a DRX cycle(s) configured or being configured at the UE; and configuring the UE with the determined rule, wherein said rule enables the UE to determine a first time period and a second time period within a DRX cycle(s), and wherein said first and second time periods do not overlap in time, and said first and second time periods are used for D2D operation and cellular operation respectively. In some embodiments, this method further comprises adapting, based on one or more criteria, the DRX cycle configuration to enable the UE to perform D2D and cellular operations over non-overlapping times.

In some embodiments, a base station comprises a processing unit configured to perform the steps of: determining, based on one or more criteria, a rule to be used by the UE for performing D2D and cellular operations over non-overlapping times of a DRX cycle(s) configured or being configured at the UE; and configuring the UE with the determined rule, wherein said rule enables the UE to determine a first time period and a second time period within a DRX cycle, and wherein said first and second time periods do not overlap in time, and said first and second time periods are used for D2D operation and cellular operation respectively. In some embodiments, the processing unit is further configured to perform the step of adapting, based on one or more criteria, the DRX cycle configuration to enable the UE to perform D2D and cellular operations over non-overlapping times.

As a result of the foregoing methods and systems, a UE can be enabled to dynamically share its receiver between cellular and D2D operations without degrading the performance of any of the two operations below a desired level. There is an overall performance benefit of cellular as well as D2D operations by exploiting DRX configuration without losing data. Further, the network can adapt DRX configuration to enable the UE to receive D2D or cellular signals, whichever is considered more critical at a given time or for given application.

While processes in the figures may show a particular order of operations performed by certain embodiments of the disclosure, it should be understood that such order is exemplary (e.g., alternative embodiments may perform the operations in a different order, combine certain operations, overlap certain operations, etc.).

While the disclosure has been described in terms of several embodiments, those skilled in the art will recognize that the disclosure is not limited to the embodiments described and can be practiced with modification and alteration within the spirit and scope of the appended claims. The description is thus to be regarded as illustrative instead of limiting.

The following acronyms are used throughout this disclosure.

2G Second Generation
3G Third Generation
3GPP 3$^{rd}$ Generation Partnership Project
ACK Acknowledgement
APP Application
ASIC Application Specific Integrated Circuit
CDMA Code Division Multiple Access
CN Core Network
CPU Central Processing Unit
CQI Continuous Quality Improvement
D2D Device-to-Device
DL Downlink
DRX Discontinuous Reception
eNB Enhanced or Evolved Node B
EPC Enhanced or Evolved Packet Core
EPDCCH Enhanced or Evolved Physical Downlink Control Channel
E-UTRAN Enhanced or Evolved Universal Terrestrial Radio Access Network
FDD Frequency Division Duplexing
FPGA Field Programmable Gate Array
GPS Global Positioning System
GSM Global System for Mobile Communications
HARQ Hybrid Automatic Repeat Request
HD-FDD Half Duplex Frequency Division Duplexing
HSPA High Speed Packet Access
IP Internet Protocol
LTE Long Term Evolution
M2M Machine-to-Machine
MAC Medium Access Control
MME Mobility Management Entity
ms Millisecond
MTC Machine-Type Communication
NACK Negative Acknowledgement
O&M Operations and Maintenance
P2P Peer-to-Peer
PDA Personal Digital Assistant
PDCCH Physical Downlink Control Channel
PGW Packet, or Packet Data Network, Gateway
PLMN Public Land Mobile Network
ProSe Proximity Service
QoS Quality of Service
RAN Radio Access Network
RAT Radio Access Technology
RB Resource Block RF Radio Frequency
RLC Radio Link Control
RNC Radio Network Controller
RRC Radio Resource Control
RRH Remote Radio Head
RRM Radio Resource Management
RTT Round Trip Time
SA Scheduling Assignment
SGW Serving Gateway
SON Self-Organizing Network
TDD Time Division Duplexing
UE User Equipment
UL Uplink
UTRA Universal Terrestrial Radio Access
UTRAN Universal Terrestrial Radio Access Network
VoIP Voice over Internet Protocol
VPN Virtual Private Network
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A wireless device enabled to operate in a cellular communications network, comprising:
   a transceiver module comprising a receiver;
   a processing module comprising one or more processing circuits; and
   a memory module storing instructions executable by the processing module whereby the wireless device is operable to:
      determine a first time period within a Discontinuous Reception, DRX, cycle for cellular operation and a second time period within a DRX cycle for Device-to-Device, D2D, operation, the first time period and the second time period being non-overlapping time periods; and
      perform a D2D operation during the second time period and a cellular operation during the first time period.

2. The wireless device of claim 1, wherein the determination of the first time period and the second time period comprises one or more of the following:
   determining the first time period and the second time period based on a predefined rule;
   determining the first time period and the second time period autonomously;
   determining the first time period and the second time period based on a message received from another node;
   determining the first time period and the second time period based on a configuration received via higher-layer signaling;
   adapting one or both of the first time period and the second time period; and
   configuring one or both of the first time period and the second time period.

3. The wireless device of claim 1 wherein the first time period is one of a DRX ON duration and a DRX OFF duration during a DRX cycle, and the second time period is another one of the DRX ON duration and the DRX OFF duration during the same DRX cycle.

4. The wireless device of claim 1 wherein the wireless device is configured with a DRX cycle for downlink cellular operation, the first time period is a DRX ON duration of the DRX cycle for downlink cellular operation, and the second time period is a DRX OFF duration of the DRX cycle for downlink cellular operation.

5. The wireless device of claim 1 wherein the wireless device is configured with a common DRX cycle for both downlink cellular operation and D2D operation, the first time period is one of a DRX OFF duration and a DRX ON duration of the common DRX cycle, and the second time period is another one of the DRX ON duration and the DRX OFF duration of the common DRX cycle.

6. The wireless device of claim 5 wherein the first time period is the DRX ON duration of the common DRX cycle, and the second time period is the DRX OFF duration of the common DRX cycle.

7. The wireless device of claim 1 wherein the first time period is a first DRX ON duration of a first DRX cycle, and the second time period is a second DRX ON duration of a second DRX cycle.

8. The wireless device of claim 1 wherein the first time period and the second time period are non-overlapping time periods within a DRX ON duration of a DRX cycle.

9. The wireless device of claim 8 wherein an amount of time during the DRX ON duration used for the first time period and an amount of time during the DRX ON duration used for the second time period are network configured.

10. The wireless device of claim 8 wherein an amount of time during the DRX ON duration used for the first time period and an amount of time during the DRX ON duration used for the second time period are decided by the wireless device autonomously.

11. The wireless device of claim 1 wherein the first time period and the second time period are configured such that the first time period and the second time period are separated in time by a time, t, for which one or both of the following condition holds:

$$Tmin \leq t \leq Tmax,$$

where Tmin is a predefined minimum amount of time and Tmax is a predefined maximum amount of time.

12. The wireless device of claim 1 wherein the first time period and the second time period are configured such that a predefined order is maintained between the first time period and the second time period.

13. The wireless device of claim 1 wherein the D2D operation performed during the second time period is reception of D2D signals, and the cellular operation performed during the first time period is reception of downlink cellular signals.

14. The wireless device of claim 1 wherein the first and second time periods are within the same DRX cycle.

15. The wireless device of claim 14 wherein the DRX cycle is one of a downlink cellular DRX cycle and a common DRX cycle for both downlink cellular and D2D operation.

16. The wireless device of claim 1 wherein the first and second time periods are within different DRX cycles.

17. The wireless device of claim 16 wherein each of the different DRX cycles is one of a downlink cellular DRX cycle and a common DRX cycle for both downlink cellular and D2D operation.

18. A method of operation of a wireless device enabled to operate in a cellular communications network, comprising:
   determining a first time period within a Discontinuous Reception, DRX, cycle for cellular operation and a second time period within a DRX cycle for Device-to- Device, D2D, operation, the first time period and the second time period being non-overlapping time periods; and performing a D2D operation during the second time period and a cellular operation during the first time period.

19. The method of claim 18 wherein the first time period is one of a DRX ON duration and a DRX OFF duration during a DRX cycle, and the second time period is another one of the DRX ON duration and the DRX OFF duration during the same DRX cycle.

\* \* \* \* \*